US011399285B2

United States Patent
Smith et al.

(10) Patent No.: US 11,399,285 B2
(45) Date of Patent: Jul. 26, 2022

(54) SECURE DEVICE ONBOARDING TECHNIQUES

(71) Applicant: Intel Corporation, Santa Clara, CA (US)

(72) Inventors: Ned M. Smith, Beaverton, OR (US); Mats Gustav Agerstam, Portland, OR (US); Nathan Heldt-Sheller, Portland, OR (US); Abhilasha Bhargav-Spantzel, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/647,403

(22) PCT Filed: Sep. 28, 2018

(86) PCT No.: PCT/US2018/053486
§ 371 (c)(1),
(2) Date: Mar. 13, 2020

(87) PCT Pub. No.: WO2019/089164
PCT Pub. Date: May 9, 2019

(65) Prior Publication Data
US 2020/0275273 A1 Aug. 27, 2020

Related U.S. Application Data

(60) Provisional application No. 62/625,184, filed on Feb. 1, 2018, provisional application No. 62/582,134, filed on Nov. 6, 2017.

(51) Int. Cl.
*H04M 1/66* (2006.01)
*H04W 12/08* (2021.01)
(Continued)

(52) U.S. Cl.
CPC ......... *H04W 12/08* (2013.01); *H04L 63/1458* (2013.01); *H04W 8/005* (2013.01); *H04W 12/35* (2021.01); *H04W 12/50* (2021.01)

(58) Field of Classification Search
USPC .................. 455/411; 370/328, 329, 330, 331
See application file for complete search history.

(56) References Cited

U.S. PATENT DOCUMENTS

| 9,686,238 B1 | 6/2017 | Row, II | |
| 2013/0039275 A1* | 2/2013 | Patil | H04W 36/36 370/328 |

(Continued)

FOREIGN PATENT DOCUMENTS

| DE | 112018005260 | 6/2020 | |
| EP | 2934039 A1 * | 10/2015 | H04W 24/02 |

(Continued)

OTHER PUBLICATIONS

"International Application Serial No. PCT US2018 053486, International Preliminary Report on Patentability dated May 22, 2020", 8 pgs.

(Continued)

*Primary Examiner* — David Q Nguyen
(74) *Attorney, Agent, or Firm* — Schwegman Lundberg & Woessner, P.A.

(57) ABSTRACT

Various systems and methods for establishing network connectivity and onboarding for Internet of Things (IoT) devices and trusted platforms, including in Open Connectivity Foundation (OCF) specification device deployments, are discussed. In an example, a zero touch owner transfer method includes operations of: receiving a first request from a new device for network access to begin an onboarding procedure with a network platform; transmitting credentials of a first network to the new device, the first network used to access a rendezvous server and obtain onboarding infor- (Continued)

mation associated with the network platform; receiving a second request from the new device for network access to continue the onboarding procedure; and transmitting credentials of a second network to the new device, as the new device uses the second network to access the onboarding server of the network platform and perform or complete the onboarding procedure with the network platform.

25 Claims, 27 Drawing Sheets

(51) Int. Cl.
*H04L 9/40* (2022.01)
*H04W 8/00* (2009.01)
*H04W 12/30* (2021.01)
*H04W 12/50* (2021.01)

(56) References Cited

U.S. PATENT DOCUMENTS

2014/0115676 A1* 4/2014 Coghlan ............ H04W 12/069
726/6
2016/0100022 A1 4/2016 Kim
2016/0105424 A1 4/2016 Logue et al.
2016/0174111 A1* 6/2016 Zhu ..................... H04W 12/04
370/331
2017/0195930 A1* 7/2017 Tomici ................ H04W 76/12
2020/0008007 A1* 1/2020 Belghoul ............. H04W 24/08

FOREIGN PATENT DOCUMENTS

WO WO-2009092115 A2 7/2009
WO WO-2017171925 A1 * 10/2017 ............ H04W 12/04
WO WO-2019089164 A1 5/2019

OTHER PUBLICATIONS

"International Application Serial No. PCT/US2018/053486, International Search Report dated Nov. 30, 2018", 5 pgs.
"International Application Serial No. PCT/US2018/053486, Written Opinion dated Nov. 30, 2018", 6 pgs.
"OCF Security Specification V1.0.0", Open Connectivity Foundation (OCF), [Online] Retrieved from the internet: <https://openconnectivity.org/draftspecs/OCF_Securi ty_Speci fi cati on_vI.0.0.pdf>, (Mar. 22, 2017), 104 pgs.

* cited by examiner

SECURE DEVICE ONBOARDING TECHNIQUES

PRIORITY CLAIM

This application is a U.S. National Stage Application under 35 U.S.C. 371 from International Application No. PCT/US2018/053486 filed Sep. 28, 2018, published as WO 2019/089164, which claims the benefit of priority to U.S. Provisional Patent Application Ser. No. 62/582,134, filed Nov. 6, 2017 and titled "ZERO-TOUCH DEVICE ONBOARDING", and 62/625,184, filed Feb. 1, 2018, and titled "PRIVACY-PROTECTED SELF SOVEREIGN IDENTITY FOR SECURE DEVICE ONBOARDING"; all of which are incorporated herein by reference in their entirety.

TECHNICAL FIELD

Embodiments described herein generally relate to data communications and interconnected device networks, and in particular, to techniques for data processing and security authentication for internet of things (IoT) devices and device networks, including zero-touch device onboarding using an authenticator obtained using a rendezvous service, and secure device onboarding using a privacy-protected self-sovereign identity.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
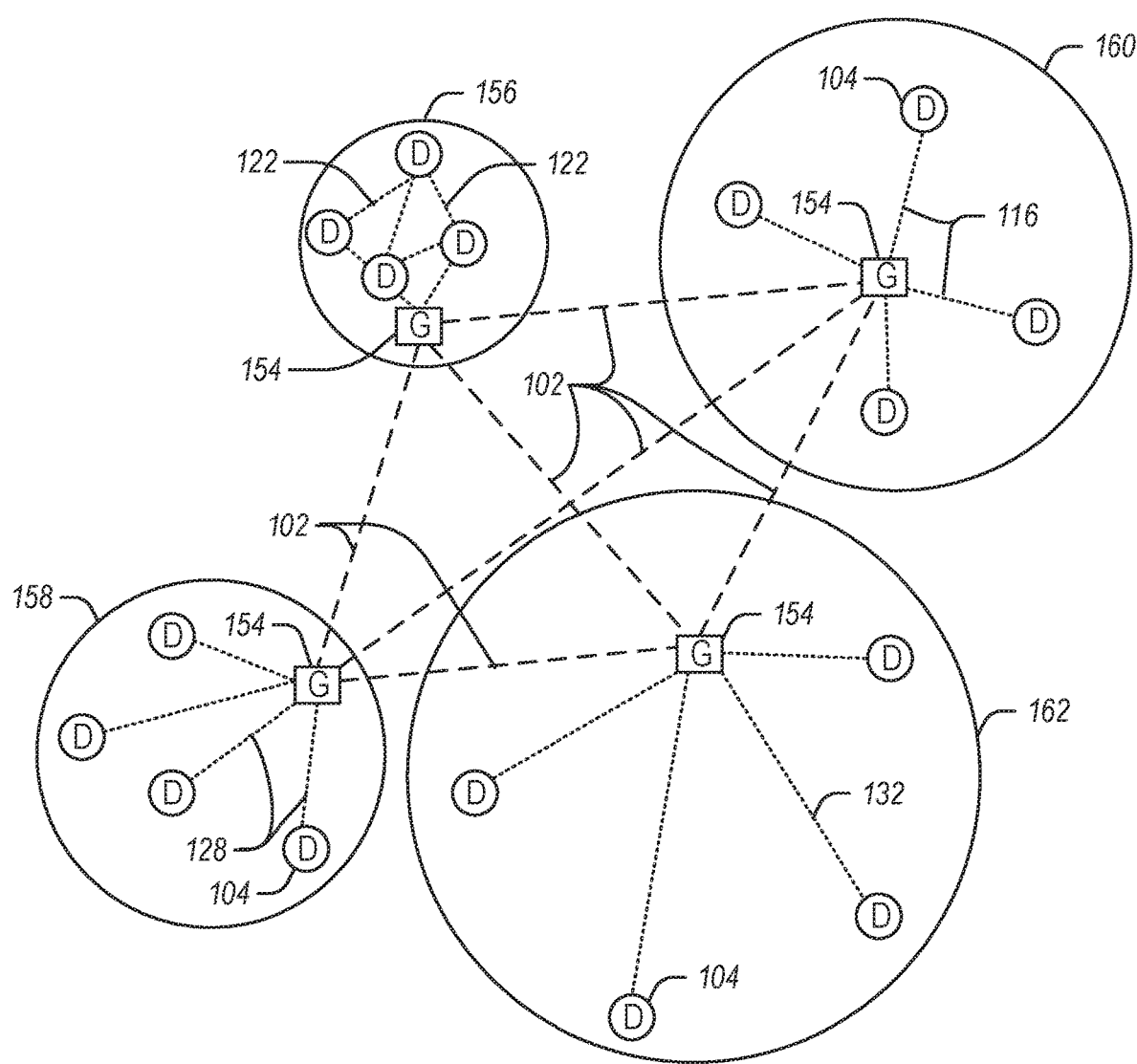
FIG. 1 illustrates a domain topology for respective internet-of-things (IoT) networks coupled through links to respective gateways, according to an example.

In the following description, methods, configurations, and related apparatuses are disclosed for the processing of security contexts in an IoT device interconnection setting through the use of a zero-touch IoT device onboarding using an authenticator obtained from a rendezvous service. For context, secure device onboarding often involves one or more touch points where security information is configured to overcome a variety of isolation barriers. One such barrier is the owner network operating in accordance with the IEEE 802.11 family of standards (e.g., Wi-Fi) that may require a Wi-Fi Protected Access (WPA) password or a site certificate to connect to a Wi-Fi access point (AP).

IoT devices typically go through a 'commissioning' or 'onboarding' process to establish trust in the device and to provision operational credentials. To accomplish this, the new device must be connected to a commissioning service. Access to the service should be secured to prevent denial-of-service and protocol attacks to the commissioning process. However, enabling secure commissioning also involves configuring the device for secure access to the commissioning service. IoT deployment scenarios may involve the need to commission many devices where there are not sufficient IT personnel to complete the task in a timely manner. Therefore, secure zero-touch commissioning is an important problem facing IoT networks.

Secure Device Onboard (SDO) technology, such as provided in implementations by the Intel Corporation of Santa Clara, Calif., offers a solution to the zero-touch commissioning problem that uses a cloud hosted Rendezvous Service (RS) to supply to-be-commissioned devices with an internet protocol (IP) address of the server that is authorized to onboard the particular device. However, possession of an IP address is not sufficient to enable the new device to connect securely to the onboarding server via an access-controlled network such as a WPA2 passkey-secured Wi-Fi network.

The OCF Owner Transfer Method (OTM) is another approach to device commissioning that relies upon a manufacturer supplied certificate or embedded PIN that authenticates the device to the onboarding server. However, the use of an OTM presumes that the device is already connected to a network (e.g., local area network (LAN)) where an IP multicast may be delivered and where the new device may report its status as ready for commissioning.

Neither of these approaches address the problem of securely connecting the new device to a network commissioning server without exposing the production network to the as-yet-untrusted device or exposing the network commissioning server to possible denial-of-service or protocol attacks while it listens for commissioning requests.

To address these issues, a zero-touch device onboarding technique is described herein. The technique uses an intermediary (e.g., mediator) to establish guest Wi-Fi credentials used to access a rendezvous service. The device registers an intent to onboard at the rendezvous service and receives information for an onboarding server (e.g., an internet protocol (IP) address for an onboarding service). The rendezvous service also alerts the onboarding service of the device's intent to onboard (e.g., via providing the device universal unique identifier (UUID) to the onboarding service). The device then contacts the intermediary again and provides the onboarding server address (or other identifier) along with its UUID. The intermediary then verifies, using the UUID, that the onboarding service is expecting the device, and provides the devices with network credentials sufficient to contact the onboarding service (e.g., credentials to a sandbox or more secure network than the previous guest access). The device may then contact the onboarding service using the new Wi-Fi credentials and complete the onboarding process (e.g., using traditional IoT onboarding techniques).

Existing solutions are not able to keep a production network secure from malicious devices masquerading as a new device. Thus, unlike the technique described herein, the existing solutions may permit denial-of-service or protocol attacks by an authenticating new device. Additional details and examples and advantages of the OTM secure device onboarding techniques will be further apparent as described from the examples below.

Additionally, in the following description, methods, configurations, and related apparatuses are disclosed for an IoT device Self Sovereign Identity (SSI) verification and registration through the use of blockchains and cryptographic protocols. The techniques described herein provide the ability to preserve the privacy of an IoT device as it is moved from one owner to the other; while not compromising on the security assurance by allowing for verifiable assertions that allow building trust on the device identity. This implementation is also extensible such that it not only operates on one single device identity, but can also be used for other values of and different types of device attributes such as location, issuer, date of manufacturing, and the like, which may or may not be unique to that device.

FIG. 1 illustrates an example domain topology for respective IoT networks coupled through links to respective gateways. The IoT is a concept in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
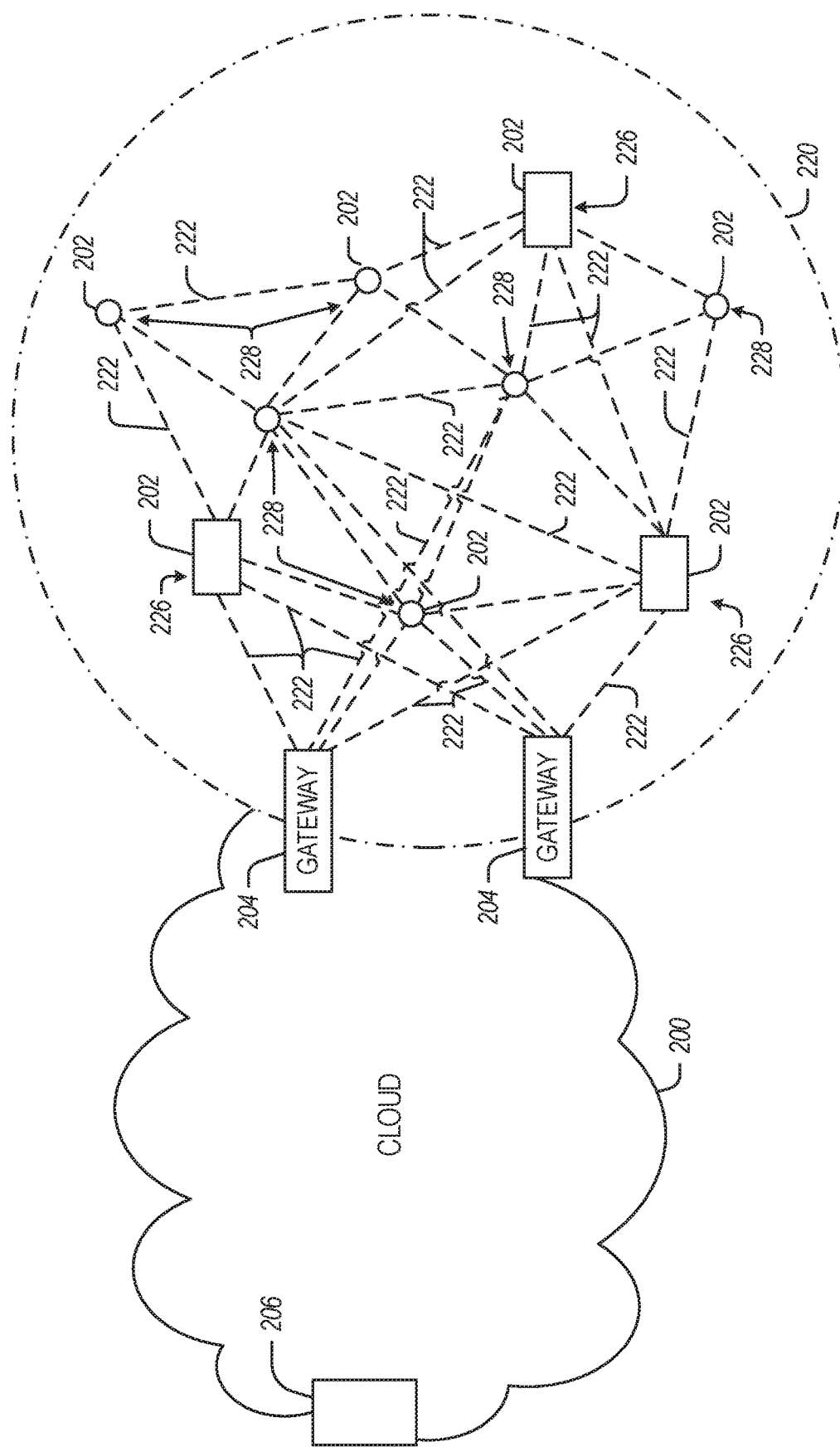
FIG. 2 illustrates a cloud computing network in communication with a mesh network of IoT devices operating as a fog device or platform connected with a cloud-computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 19 and 20.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and enabling the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, enabling communications to be maintained, even with the loss of a number of IoT devices 202. Further, the use of a mesh network may enable IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog platform may be configured in a declarative programming style, enabling the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device the IoT devices 202, such as particular sensors 228, needed to answer the query. The data from these sensors 228 may then be aggregated and analyzed by any combination of the sensors 228, data aggregators 226, or gateways 204, before being sent on by the fog network 220 to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

In an OCF network architecture, physical entities in the real world (e.g., a temperature sensor) may be represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

As discussed herein, the following techniques may be implemented in connection with use of various OCF services and transactions, including DOTS (also known as DOXS, Device Owner Transfer Service). In a further example, the following techniques may be implemented in connection with onboarding functionality provided by an OCF onboarding tool (OBT). In the context of an OCF implementation, an OBT is a logical entity within a specific IoT network that establishes ownership for a specific device and helps bring the device into an operational state within that network. For instance, a typical OBT may implement DOTS, AMS (Access Management Service), and CMS (Credential Management Service) functionality.

The following paragraphs discuss examples of a zero-touch onboarding method (an owner transfer method) which enables a new device to interact with a mediator (e.g., an OCF Mediator) to obtain network details (e.g., Wi-Fi easy setup values). These network details are then used to enable the device to connect to a cloud service that is a rendezvous point where the new device and the expected owner (OCF DOTS) agree to connection information that enables the device and onboarding service to connect directly. Further, an owner manifest may be used by the device to verify the owner domain (e.g., the DOTS domain) is the intended device owner.

In these examples, SDO and OCF OTM approaches may be integrated, using a two-step approach to introduce the new device to the commissioning server. In one implementation, the first step is to perform a partial OCF onboarding that takes advantage of available embedded PIN, manufacturer certificate or simple 'just works' Diffie-Hellman exchange to establish a secure connection using a software access point (SoftAP) connection to a mobile (e.g., untrusted) mediator. The mediator provisions Wi-Fi settings suitable for gaining 'guest' access to the Internet. The guest network is isolated from the production network. With access to the Internet, the SDO rendezvous service is used to register the device's intent to be onboarded; however, the device does not know which onboarding server to use. The SDO components supply an IP address of the intended onboarding server when the onboarding server makes its availability known to the rendezvous service. The device also knows its platform UUID that was embedded in the device by the device manufacturer. The device (in the second step below) then uses this IP address and UUID to authenticate a second time to the mediator service who verifies the onboarding server is expecting a connection from the new device.

The second step then may involve the device enabling a SoftAP to enable the mediator to connect to the device to collect the IP address and platform UUID. The mediator may drop the SoftAP connection and open a secure connection to the production network's AP (or may use a second connection resource to connect). The mediator notifies the onboarding server (e.g., using the IP address to find a route to the host) and verifies the platform UUID is among the ones described by the rendezvous service.

With this implementation, the mediator may configure the device to connect to a sandbox network (e.g., local area network, LAN) that is isolated from the production network but available to the onboarding server. The new device uses the IP address obtained from the rendezvous service to connect to the onboarding server. The SDO protocol may be used to complete ownership transfer, but at this point provisioning still may not be completed. The onboarding server then provisions local credentials that enables the device to reconnect to the production network where device provisioning may be completed securely.

This technique enables the new device to obtain secure access to a guest (e.g., isolation) Wi-Fi network, preventing the possibly misbehaving new device from posing a threat to the production network (it is trying to be commissioned into). A second attempt to connect to an isolation Wi-Fi network is permitted after the device supplies the correct IP address and platform UUID to a mediator that is also aware of this information. The mediator configures the Wi-Fi parameters to the second isolation network. The new device does not have access to the production network, but is able to obtain access to the onboarding server. However, if the new device does not have the expected UUID and the correct IP address, then the onboarding server can handle this request (e.g., by treating the request as a possible denial-of-service attack). Upon completion of the second step, the device will obtain new credentials and Wi-Fi configuration details necessary to connect securely to the production Wi-Fi network. In an example, a random nonce may be supplied to the rendezvous service where the new device presents the 3-tuple (UUID, IP address, nonce) as the response to an authentication challenge, to further increase security.

Figure 3:
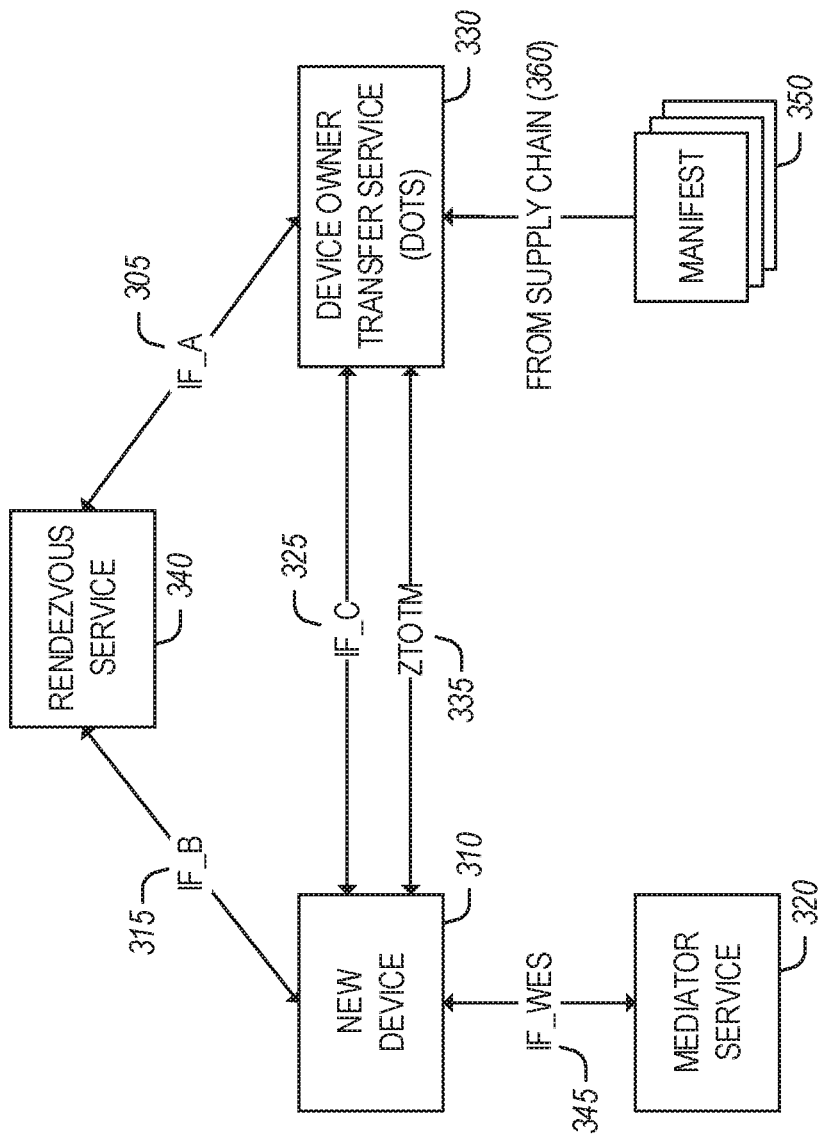
FIGS. 3 and 4 illustrate block diagrams of components participating in zero-touch device onboarding, according to respective examples.

FIG. 3 illustrates a block diagram of components participating in zero-touch device onboarding, according to a first example. The component configuration illustrated in FIG. 3 may be referred to as a first implementation of a zero-touch owner transfer method (ZTOTM) onboarding technique, which utilizes specific interfaces (A, B, and C, which are discussed below). It will be understood that the various services and entities may be instantiated on the same or separated nodes in various types of an edge, fog, or IoT network, where the nodes include hardware and software instances configured to provide the service.

In an example, the Mediator Service 320 configures a New Device 310 with Wi-Fi (or other wired or wireless network) configuration parameters that enable the New Device 310 to connect directly to a network access point (not shown). For instance, the Mediator Service 320 relies on a SoftAP (or similar) technology available in the New Device 310 that enables the Mediator Service 320 to connect to the New Device 310 while avoiding being involved in the message passing path, or data path, of the New Device 310. The New Device 310 then performs a combination of Secure Device Onboard (SDO) and OCF Owner Transfer Method (OTM) operations (e.g., via the Device Owner Transfer Service (DOTS) 330) in order to complete a "zero-touch" onboarding process.

In an example, the ZTOTM architecture depicted in FIG. 3 includes the New Device 310, three services (DOTS 330, Mediator Service 320, and Rendezvous Service 340), five interfaces (IF_A 305, IF_B 315, IF_C 325, IF_WES 345, and ZTOTM 335), and a Manifest file 350 that is obtained from the device manufacturer or supply chain 360. Each element of the architecture is described as follows:

New Device 310—The physical platform that hosts the device (e.g., an OCF Device) to be onboarded.

Mediator Service (MS) 320—The network service (e.g., OCF Service) that configures the new device with connectivity parameters.

Device Owner Transfer Service (DOTS) 330—The network service (e.g., OCF Service) that implements the Zero-Touch OTM operations and interfaces with the Rendezvous Service 340 and the New Device 310.

Rendezvous Service 340—The untrusted cloud-hosted service that acts as a meeting point for the New Device 310 and the DOTS 330. The Rendezvous Service 340 coordinates establishment of a direct connection between the New Device 310 and the DOTS 330. The Rendezvous Service 340 maintains a mapping of platform UUIDs and domain owners.

Manifest 350—The file containing a series of digital signatures attesting to the supply chain provenance of the platform that hosts the New Device 310. In various examples, the manifest may be stored (or provided) as a file (or files) on one or more nodes.

Interface A (IF_A) 305—The interface between the DOTS 330 and the Rendezvous Service 340 that: (1) Allows DOTS 330 to identify itself to the Rendezvous Service 340; (2) Is used to register the DOTS connectivity configuration to be used by the New Device 310 to complete the onboarding process; and (3) Allows pars 330 to obtain the platform UUID corresponding to the device to be onboarded (e.g., New Device 310).

Interface B (IF_B) 315—The interface between New Device 310 and Rendezvous Service 340 that: (1) Allows the New Device 310 to identify itself to the Rendezvous Service 340 using its platform UUID; and (2) Allows the New Device 310 to obtain the DOTS connectivity configuration information from the Rendezvous Service 340 that describes connection parameters to connect to DOTS 330.

Interface C (IF_C) 325—The interface between New Device 310 and DOTS 330 that: (1) Establishes trust in the New Device 310 by the DOTS 330 based on a manufacturer embedded key; (2) Establishes trust in the DOTS 330 by the New Device 310 based on a manifest constructed by the supply chain 360; and (3) Establishes local credentials used to complete the onboarding.

Interface WES (IF_WES) 345—The interface between the New Device 310 and Mediator Service 320 that configures localized network connectivity parameters sufficient for enabling the New Device 310 to establish an untrusted connection to the Rendezvous Service 340. With use of the IF_WES interface 345, the New Device 310 is discovered by the Mediator Service 320 and connects using the device's soft access point (SoftAP) interface. The Mediator Service 320 detects that the device supports the Zero Touch OTM procedure and configures settings that enables the device to connect to the Rendezvous Service 340.

ZTOTM Interface 335—The interface between New Device 310 (e.g., in the capacity of an OCF Device) and the DOTS 330 that completes onboarding and initial provisioning (e.g., OCF onboarding and initial provisioning).

In the example depicted in FIG. 3, the ZTOTM procedure depends on successful completion of communications via the IF_C interface which further depends on successful completion of communications via the IF_A 305, IF_B 315, and IF_WES 345 interfaces. Returning to the data flows depicted in FIG. 3, with use of the ZTOTM interface 335, the New Device 310 uses information supplied by the IF_WES interface 345 to invoke the IF_B interface 315. Upon completion of the IF_B communication the New Device 310 contacts the DOTS 330 over the IF_C interface 325. The DOTS 330 uses the IF_A interface 305 to enable the IF_B interface 315 to complete and to obtain the onboarding UUID corresponding to the New Device 310. The New Device 310 contacts the DOTS 330 over the IF_C interface 325 when the IF_A interface 305 and IF_B interface 315 communications are complete.

During the IF_C communications, the domain owner establishes trust in the platform hosting the New Device 310 and the New Device 310 establishes trust in the domain owner. Prior to completing the IF_C communications, the owner establishes credentials for the IF_ZTOTM interface 335. These may be symmetric, asymmetric or both. The IF_C interface 325 then completes (e.g., closes).

The New Device 310 transitions to RF_OTM device state (if needed). DOTS 330 discovers new device by finding all new devices that support the zero-touch OTM. DOTS 330 selects the zero-touch OTM and establishes a secure connection using the credentials established during the IF_C communications. In an example, the New Device 310 may use the zero-touch onboarding UUID supplied with the Manifest 350 as its temporary deviceuuid.

Figure 4:
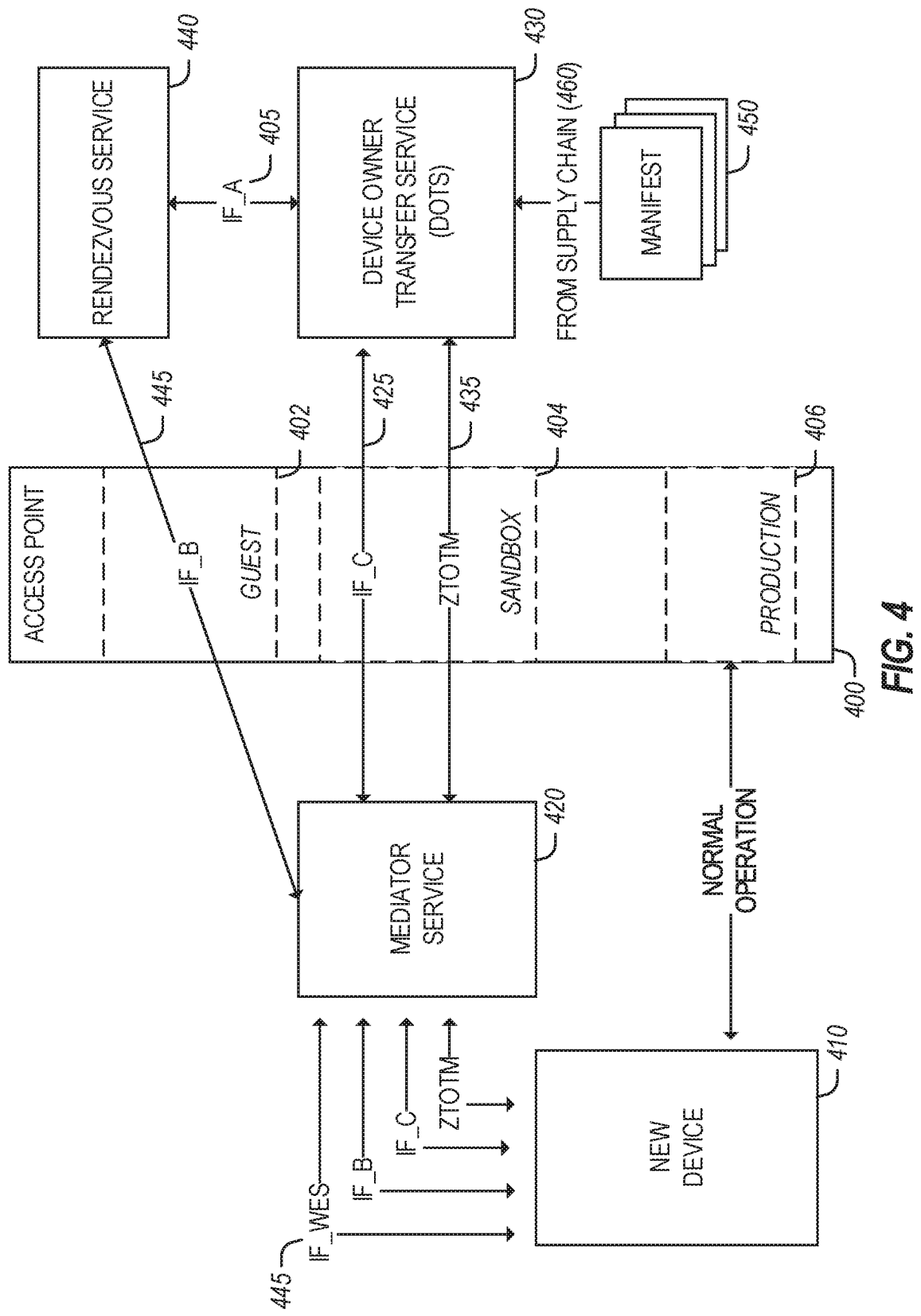
Figure 5A:
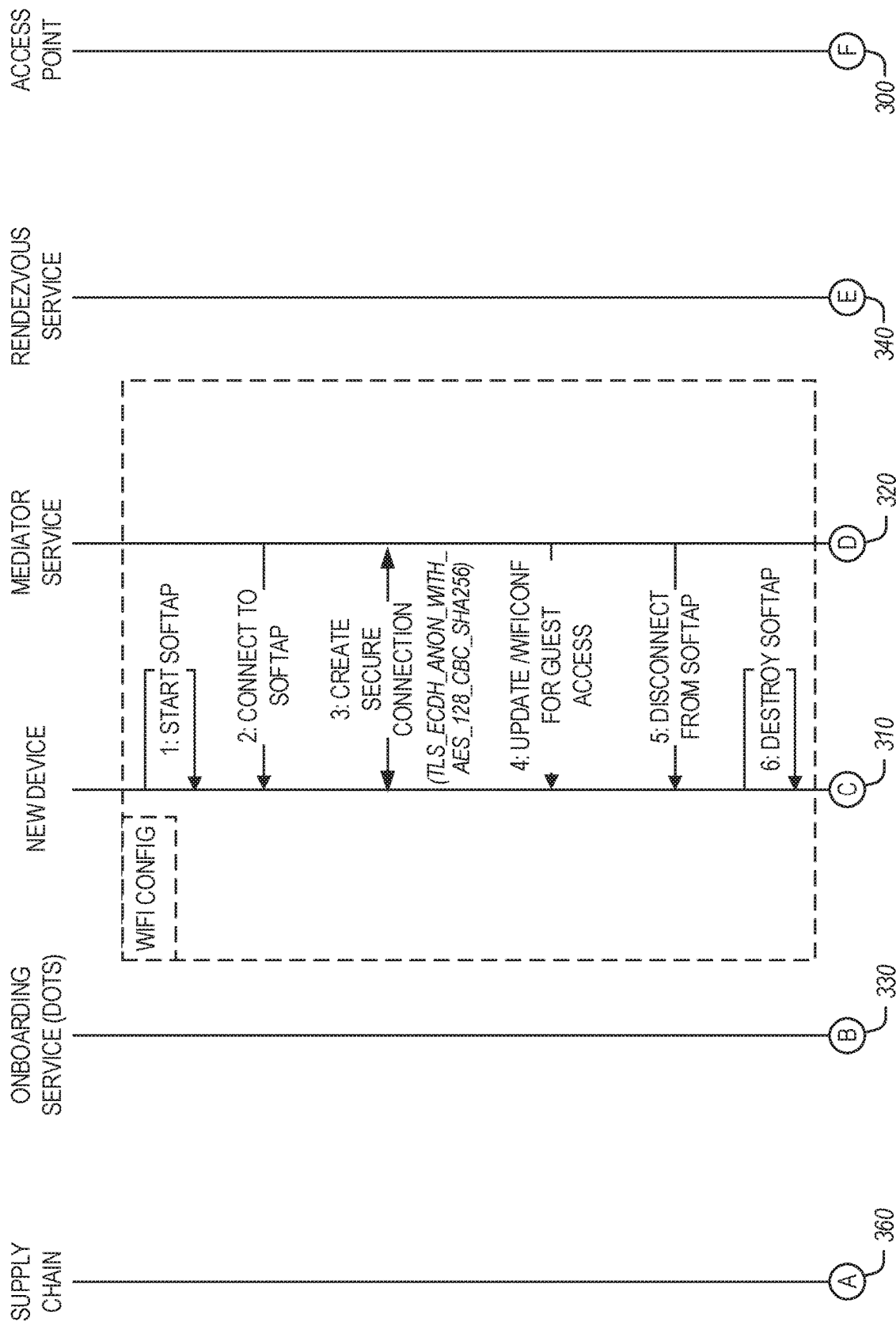
FIGS. 5A-5E illustrate a swim-lane messaging diagram for zero-touch device onboarding, according to an example of a first implementation.
Figure 5B:
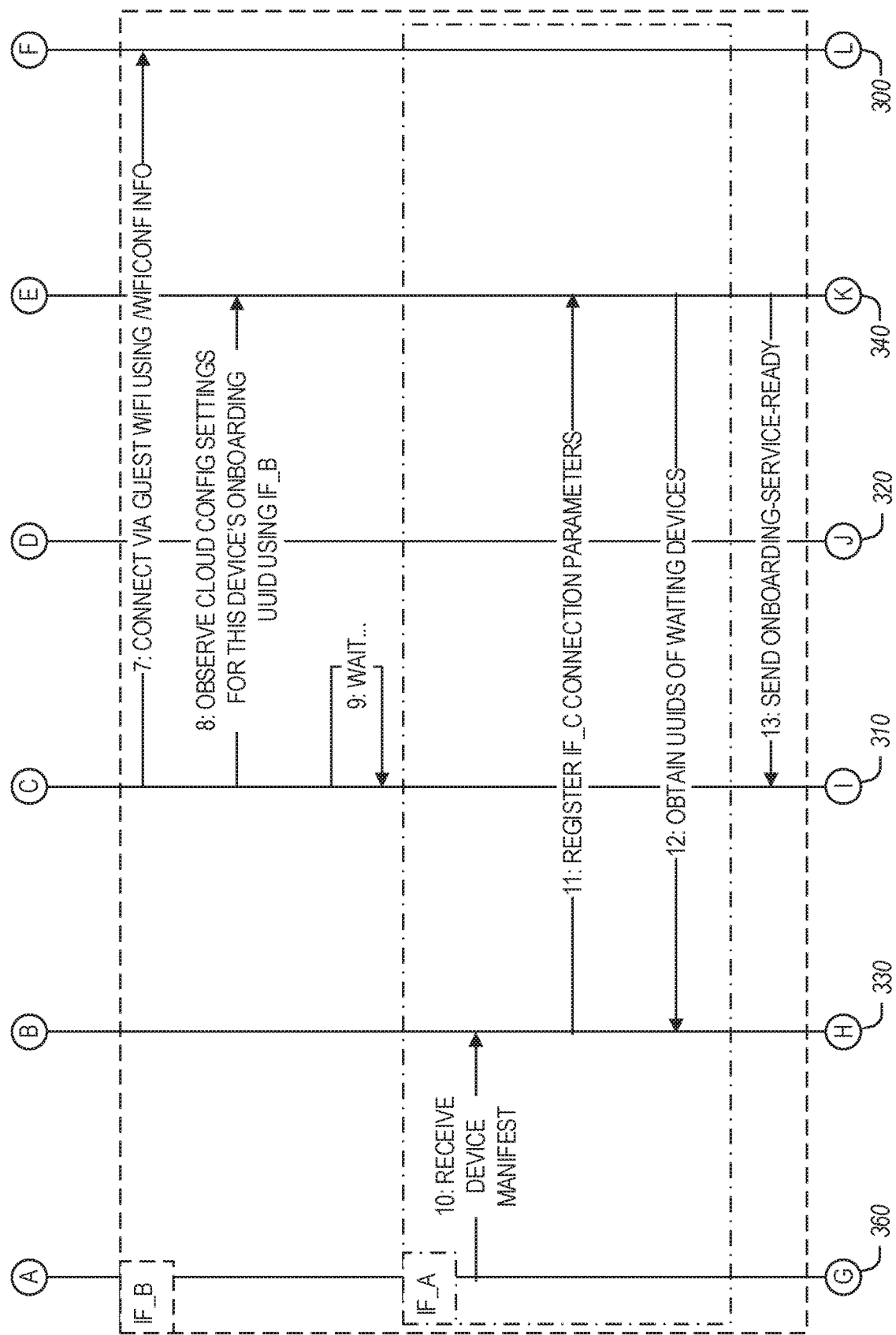
Figure 5C:
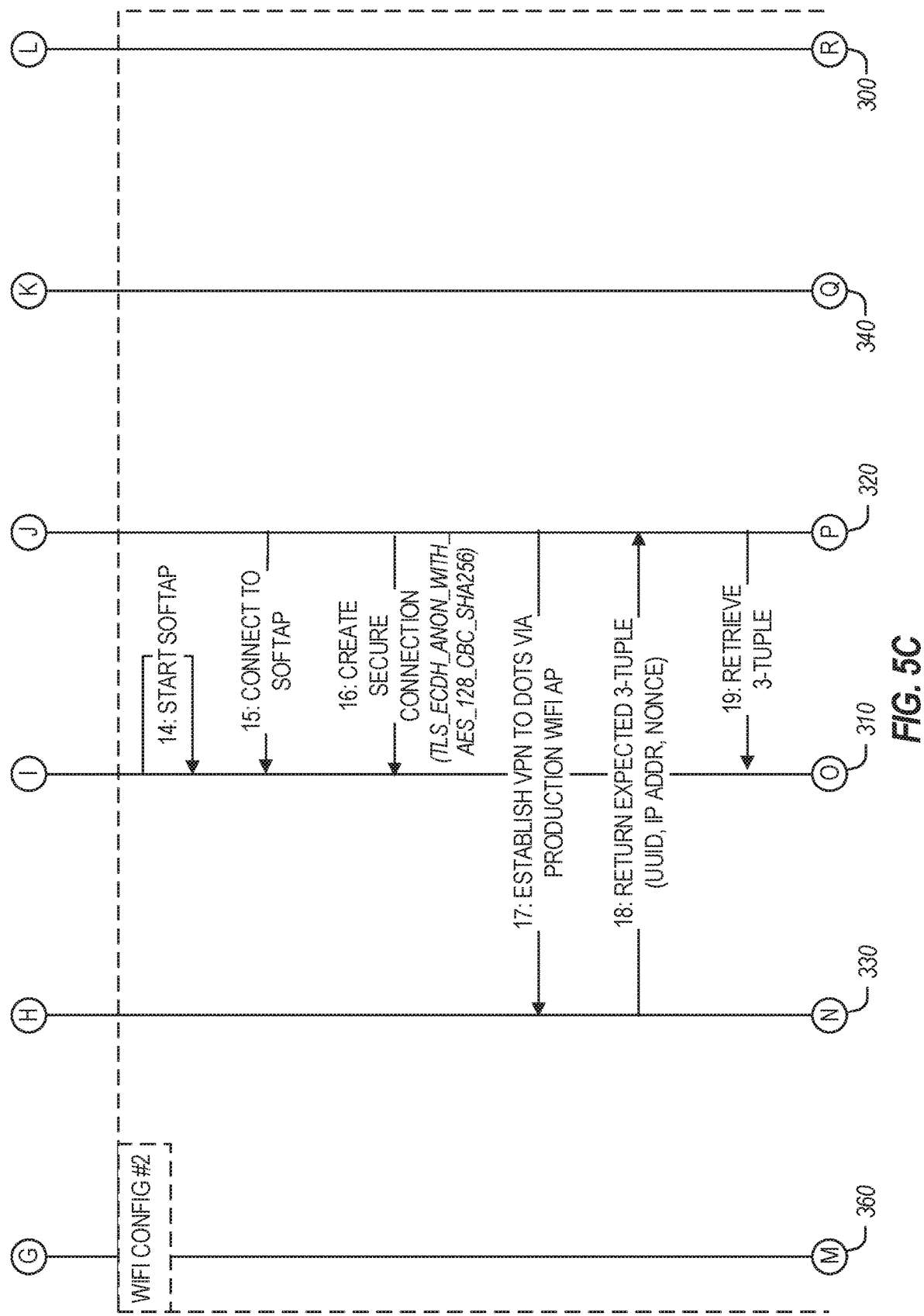
Figure 5D:
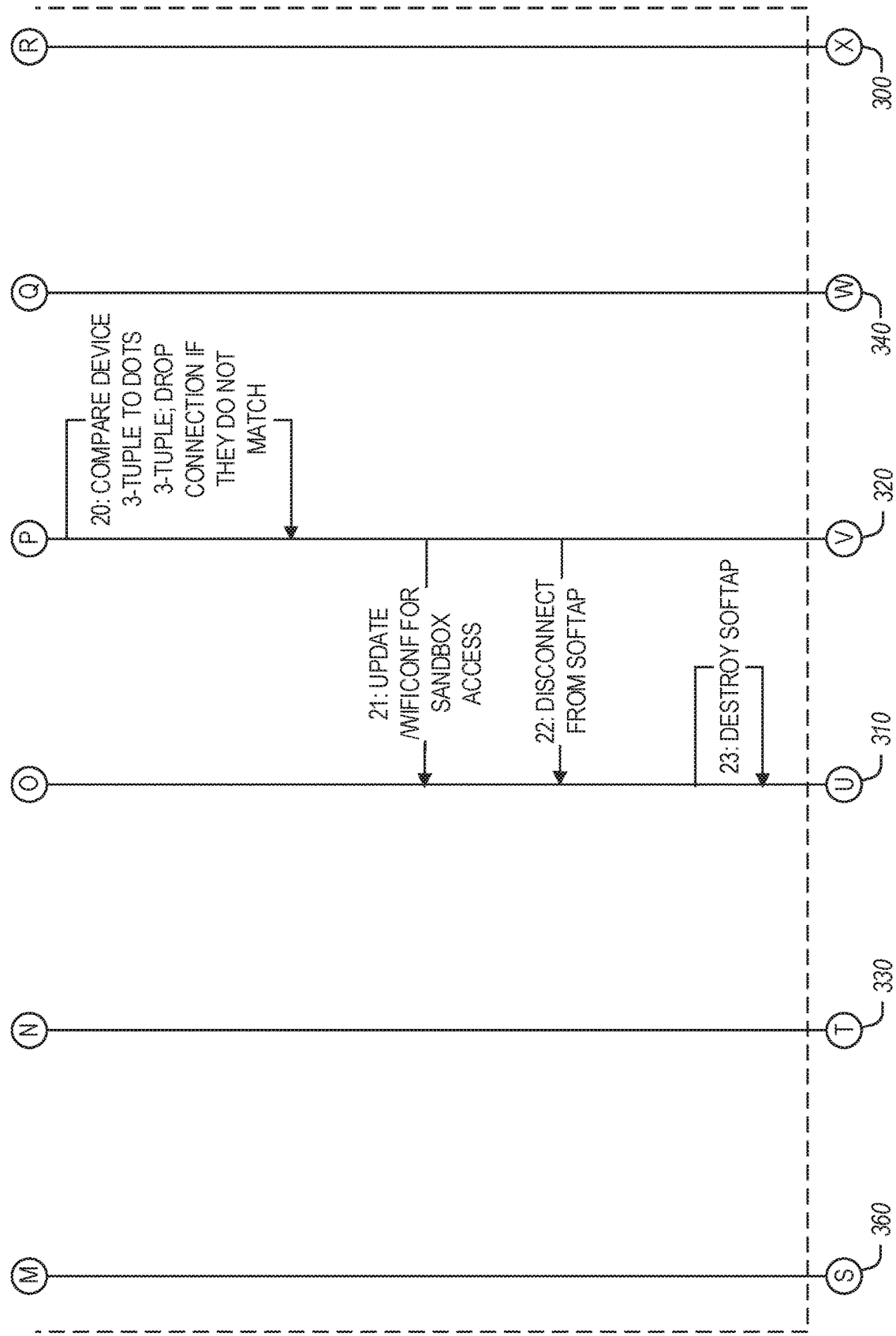
Figure 5E:
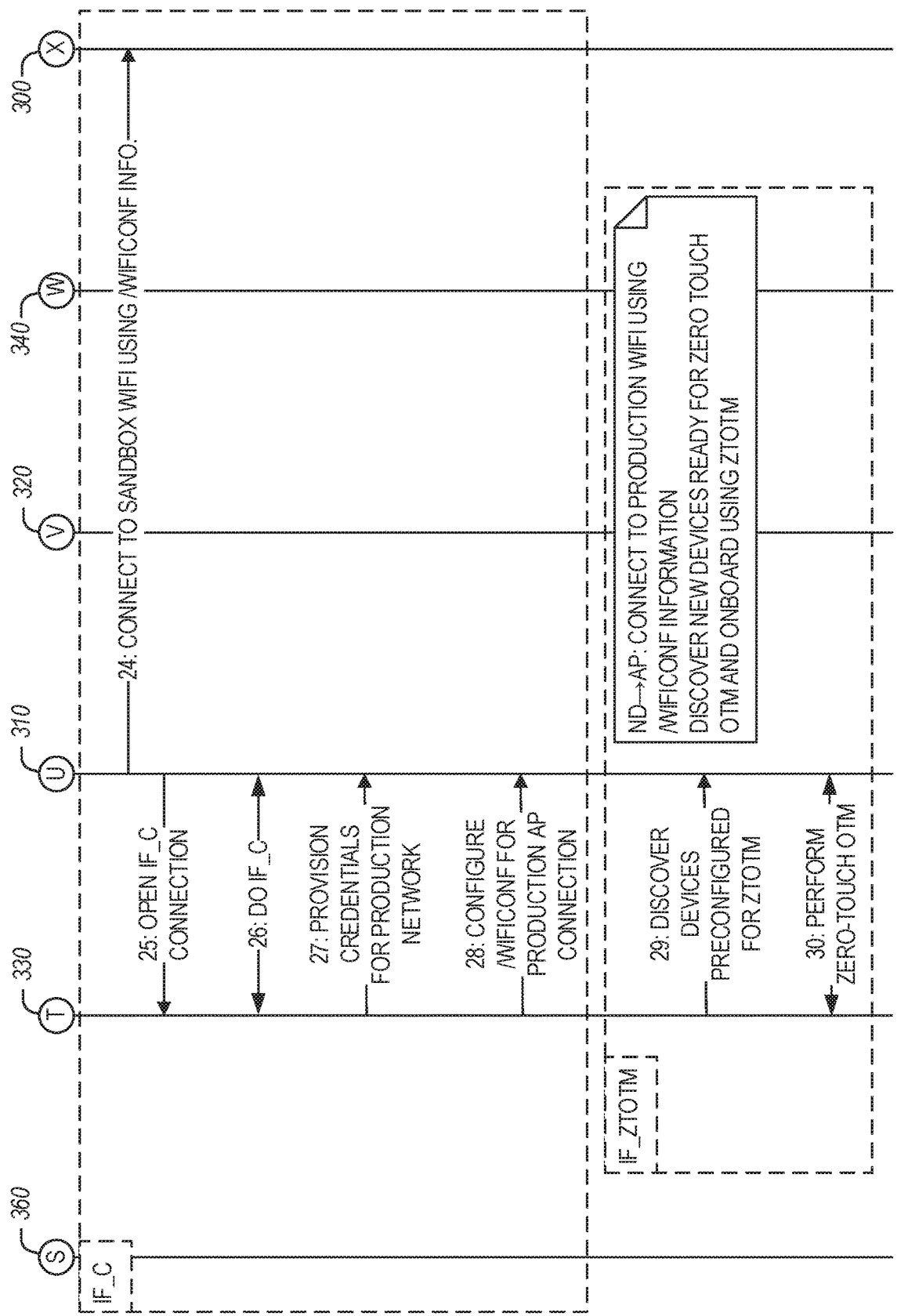
Figure 6A:
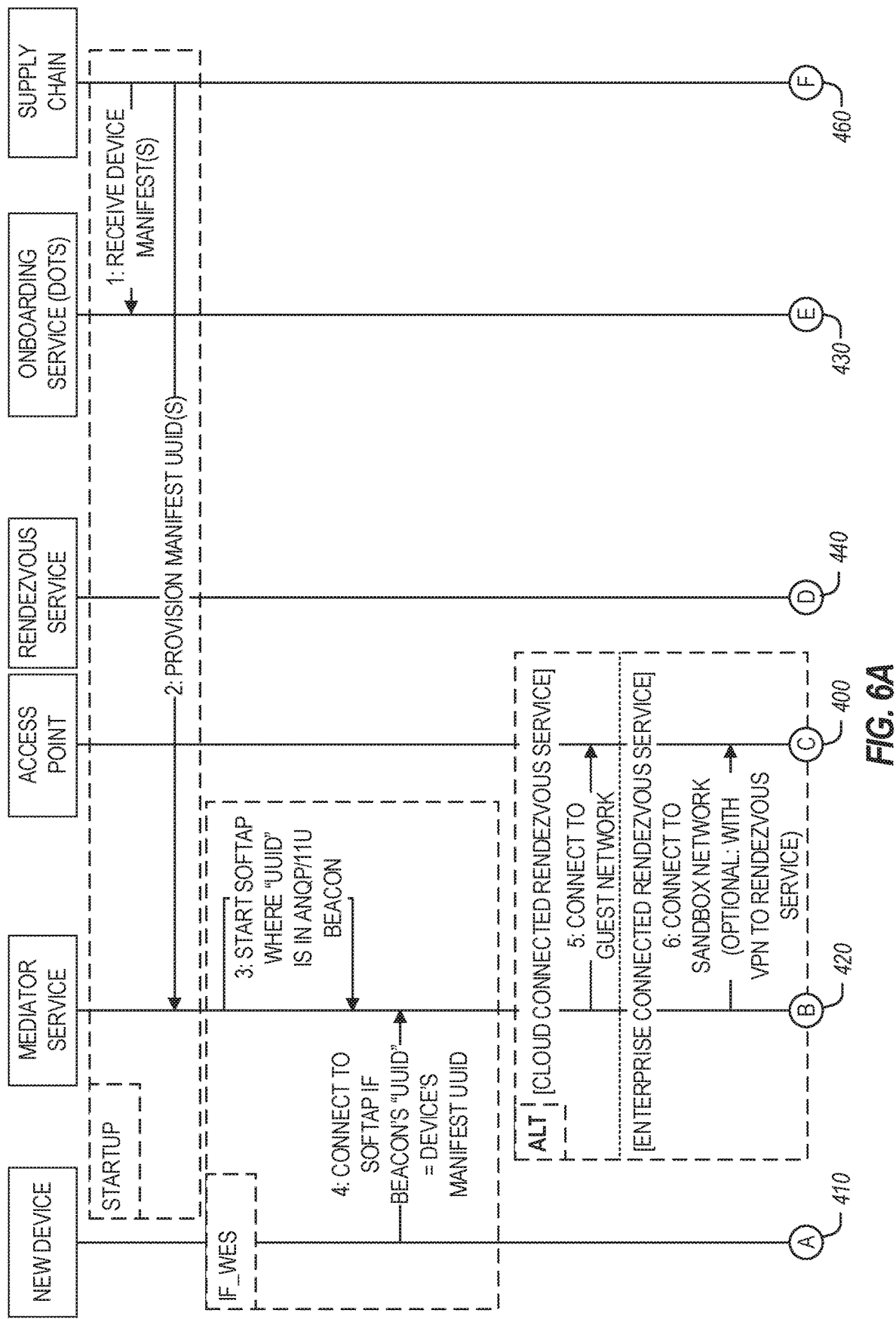
FIGS. 6A-6D illustrate a swim-lane messaging diagram for zero-touch device onboarding, according to an example of a second implementation.
Figure 6B:
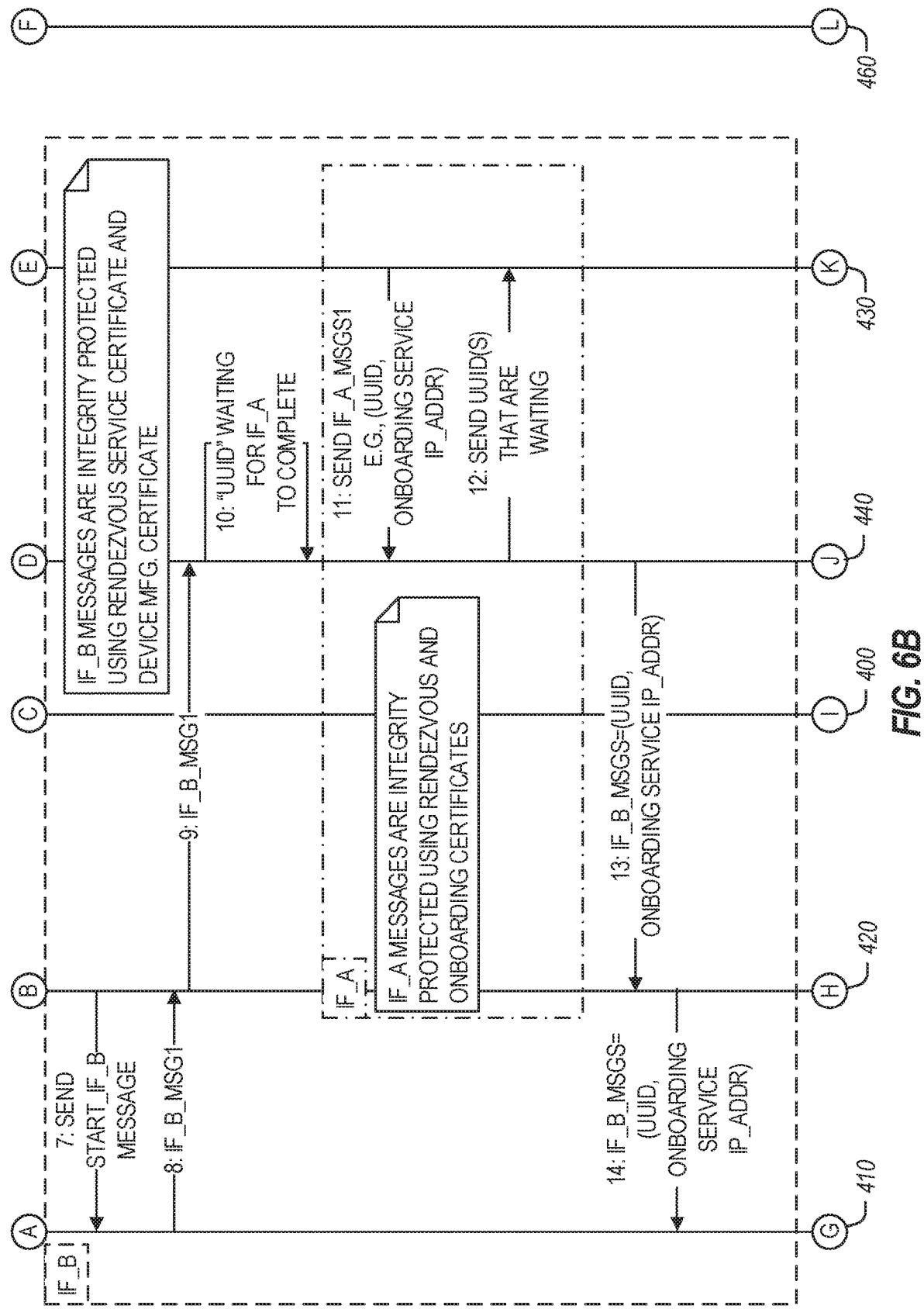
Figure 6C:
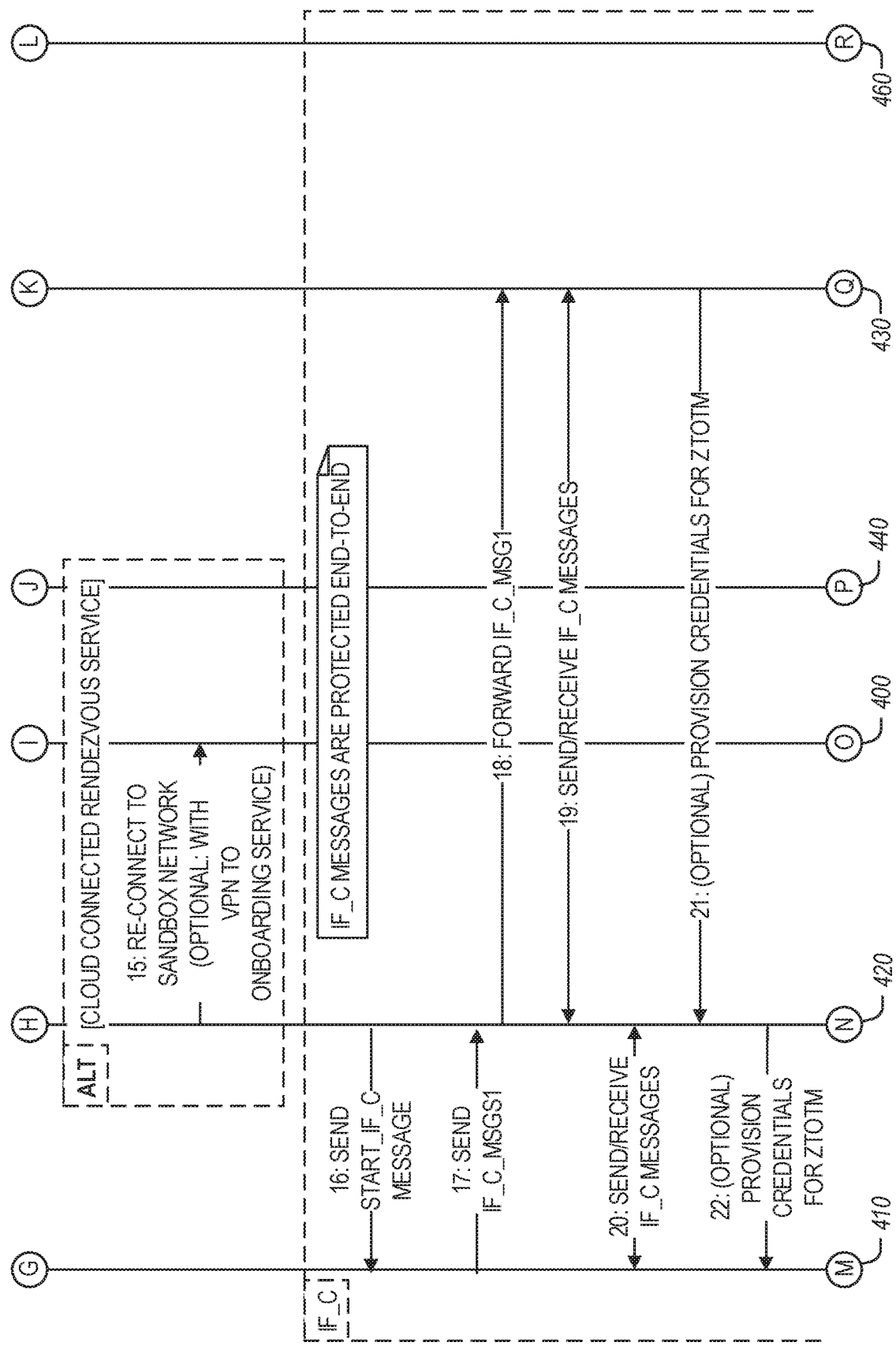
Figure 6D:
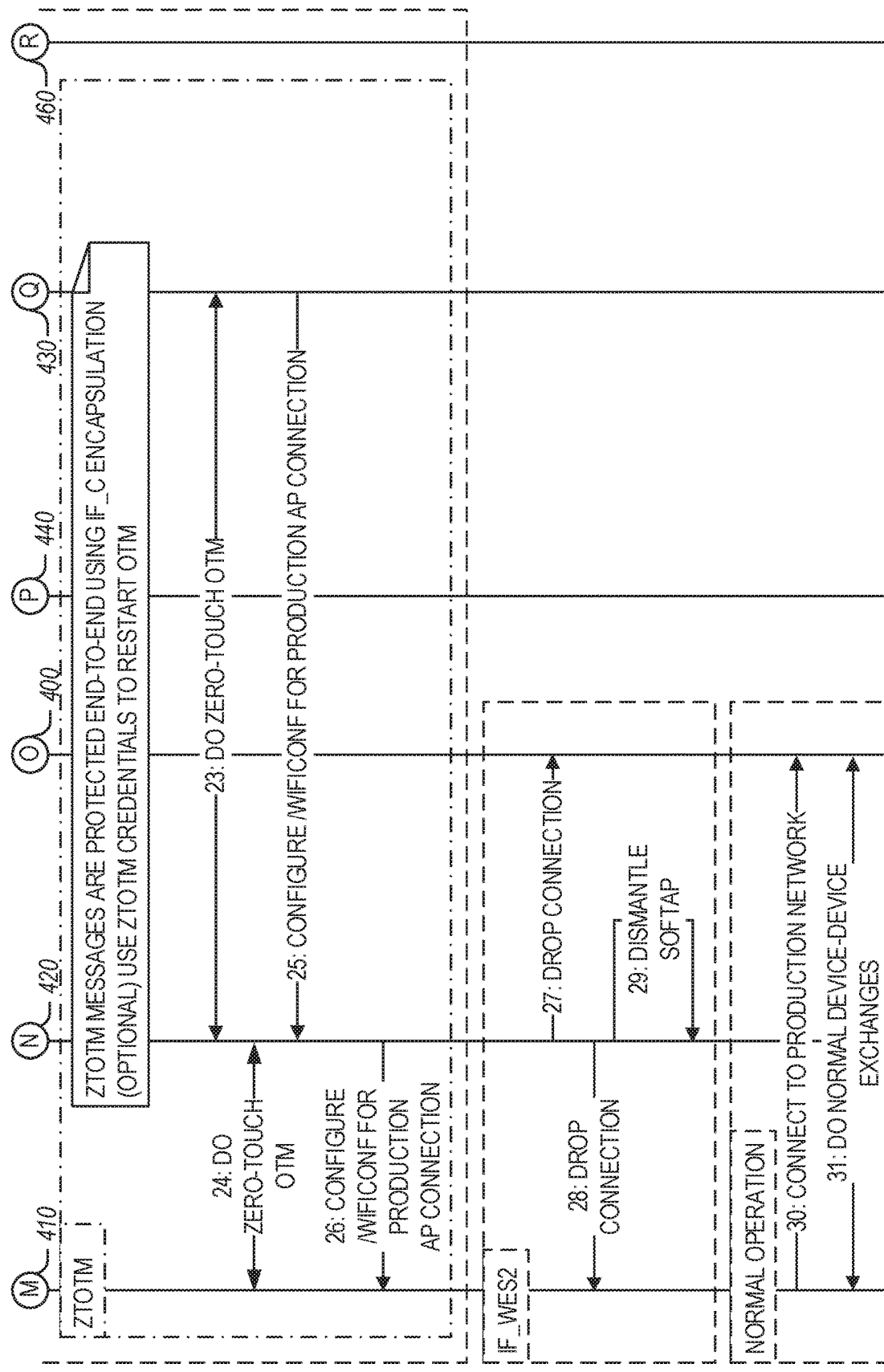

FIG. 4 illustrates a block diagram of components participating in zero-touch device onboarding, according to a second example. The component configuration illustrated in FIG. 4 may be referred to as a second implementation of a ZTOTM onboarding technique, which provides interoperability through specific interfaces (WES and ZTOTM) discussed below.

In this example, Interfaces IF_A 405, IF_B 445, and IF_C, 425 are not expressly defined or constrained for OCF interoperability. (Rather, interoperability may be achieved through reference code, or other mechanisms). However, in this example, Interfaces IF_WES 445 and ZTOTM 435 enable OCF interoperability based on the following characteristics:

Interface WES (IF_WES) 445. In an example, a New Device 410 is discovered by a Mediator Service 420 (e.g., an OCF mediator service) that connects to the New Device 410 using the device's soft access point (SoftAP) interface. The Mediator Service 420 detects that the New Device 410 supports the zero-touch OTM and configures settings that enable the device to connect to the Rendezvous Service 440.

Interface ZTOTM 435. In an example, the New Device 410 uses information supplied by IF_WES 445 to invoke the IF_B 445 interface. Upon completion of IF_B 445, the device contacts the DOTS 430 over IF_C 425. The DOTS 430 uses IF_A 405 to enable IF_B 445 to complete, and to obtain the onboarding UUID corresponding to the New Device 410. The New Device 410 contacts the DOTS 430 over IF_C 425 when IF_A 405 and IF_B 445 are complete. The New Device 410 then transitions to RF_OTM device state (if needed). DOTS 430 discovers the New Device 410 by finding all new devices that support the zero-touch OTM procedure. DOTS 430 selects the zero-touch OTM and establishes a secure connection using the credentials established during IF_C 425 communications. The New Device 410 may use the zero-touch onboarding UUID supplied with the Manifest 450, for instance, as its temporary device UUID.

In an example, the Mediator Service 420 plays the role of a "proxy," where messages associated with the various interfaces (e.g., IF_B 445, IF_C 425, ZTOTM 435) are relayed between the New Device 410 and the other services by the Mediator Service 420. The Mediator Service 420 continues to facilitate manipulation of the network access point 400 by specifying a type of network isolation capability. For example, a guest network 402 may enable access to the Internet while keeping those devices in a production wireless LAN (WLAN) isolated. A sandbox network 404 may maintain a dedicated (e.g., virtual private network (VPN)) connection to an interior service that assists with zero-touch onboarding but is isolated from the production network 406. The Mediator Service 420 may also host a SoftAP service that enables the New Device 410 to connect to the Mediator Service 420 without exposing the suspicious New Device 410 to any available AP until onboarding is complete.

In an example, the Mediator Service 420 broadcasts its beacons using SoftAP to enable the New Device 410 to discover the correct Mediator designated to handle onboarding. For example, the IEEE 802.11u family of standards describes a method for encoding, in a discovery beacon, an extension IE indicating that the AP supports ANQP/11u capability. The New Device 410 may then subsequently interrogate the SoftAP without a priori association to the SoftAP and without having the service set identifier (SSID). 802.11u provides the capability to discover properties and attributes such as: (1) Network type, guest, private, etc.; (2) Network authentication type, enrollment options; (3) IP address type; (4) NAT type; (5) EAP methods, credentials required; (6) Domain names belonging to the owner; and (7) Vendor extensions.

The New Device 410 may utilize its 'manifest UUID' value (e.g., embedded in the SDO-capable platform) to recognize the 802.11u beacon that contains the UUID. This enables the New Device 410 to self-select and self-load-balance onboarding operations according to the intended mediator service (e.g., Mediator Service 420). If multiple Mediator Services are hosting SoftAP in the same general location as multiple devices to be onboarded, the New Device 410 may be confused as to which mediator service it should select, or—in the case of the first implementation (shown in FIG. 3) as previously discussed—multiple mediators may be confused over which new device to select for onboarding. In other examples, if IEEE 802.11u is not supported, a SoftAP may encode the device's 'manifest UUID' in the SSID where the New Device 410 then selects the SoftAP with the UUID value that matches the manifest UUID value.

802.11u may be used in other ways to improve onboarding efficiency and to reduce 'touching' the device. For example, the Access Point 400 may provide the uniform resource identifier (URI) or IP address for the Rendezvous Service 440 or the Onboarding Server over an Access Network Query Protocol (ANQP)/Generic Advertisement Service (GAS) channel as an alternative for the device. This may be especially helpful in the first ZTOTM implementation (shown in FIG. 3) where the device may connect directly to the Onboarding or Rendezvous services. In an example, if ANQP/GAS is supported by 802.11u, the AP 400 broadcasts 11u capabilities, which the client may use to discover properties or characteristics of the network in order to connect to an intended mediator (or, an acceptable mediator among a plurality of mediators).

FIGS. 5A-5E illustrate a swim-lane messaging diagram for zero-touch device onboarding, according to an example. The messages illustrated in FIGS. 5A-5E correspond to the first ZTOTM implementation described above with respect to FIG. 3. As shown, a series of communications are exchanged among the entities 310, 320, 330, 340, 360, to perform the first ZTOTM implementation. The operations depicted in FIGS. 5A-5E thus provide further implementation details of those operations discussed above for FIG. 3.

FIGS. 6A-6D illustrate a swim-lane messaging diagram for zero-touch device onboarding, according to an example. The messages illustrated in FIGS. 6A-6D conform to the second ZTOTM implementation described above with respect to FIG. 4. As shown, a series of communications are exchanged among the entities 400, 410, 420, 430, 440, 460, to perform the second ZTOTM implementation. The operations depicted in FIGS. 6A-6D thus provide further implementation details of those operations discussed above for FIG. 4.

The "ALT" flows depicted in the second ZTOTM implementation of FIGS. 6A-6D illustrates how a Rendezvous Service 440 may be hosted in an internet cloud service. It may not be desirable to enable monitoring of device deployment activity over the Internet or a cloud-hosting provider. This configuration enables the Mediator Service 420 to apply a site-specific policy as to the network in which the Rendezvous Service 440 is hosted.

In an example, the onboarding process depicted in FIGS. 6A-6D may encounter a condition and halt, using restart to complete. If this condition occurs, subsequent to message 22 in the flow (depicted in FIG. 6C), the ZTOTM may be reconstructed securely without re-onboarding the New Device 410 using a Manifest (from the Supply Chain 460) or the Rendezvous Service 440. This is accomplished by supplying ZTOTM credentials as part of the IF_C interactions. The ZTOTM onboarding steps may be normally accomplished by encapsulating these messages inside the IF_C message container. However, if the IF_C context is lost, the onboarding will be restarted. An additional benefit of provisioning ZTOTM credentials during IF_C is that such credentials may also be used as the New Device 410 and Onboarding Service 430 "owner" credentials (e.g., for use in the OCF network). These credentials may be subsequently used to accomplish other device management operations.

Figure 7:
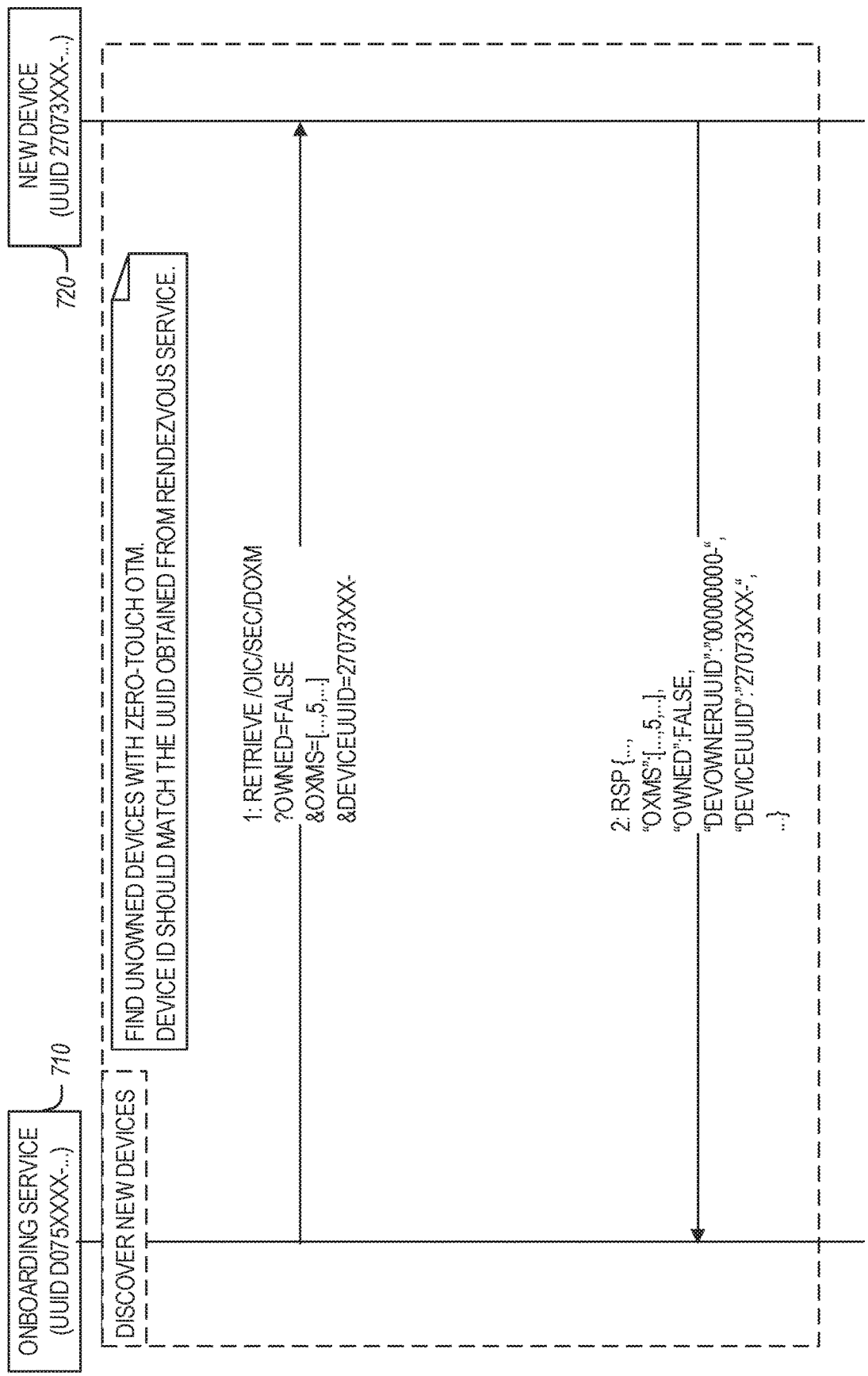
FIG. 7 illustrates a swim-lane messaging diagram for a procedure of discovering new devices, according to an example.

FIG. 7 illustrates a swim-lane messaging diagram for an example procedure of discovering new devices. In this example, this procedure is performed by an Onboarding Service 710 (e.g., DOTS) to discover new devices that support ZTOTM capabilities, as the Onboarding Service 710 requests identification information from relevant devices such as New Device 720. For example, in an OCF implementation, after the DOTS has obtained manifests corresponding to devices supporting zero touch onboarding, the DOTS may alter device discovery to select only devices that support the ZTOTM procedure. DOTS may also select only devices whose deviceuuid is that of the onboarding UUID found in its manifest file.

In a first communication, depicted in FIG. 7, the Onboarding Service 710 discovers new device(s) that support the ZTOTM procedure. In an example, discovery may target a specific device by specifying the onboarding UUID value obtained from its manifest file. In the second communication, depicted in FIG. 7, provided in response to the first communication request, the New Device 720 responds with an identifier. This identifier should match the UUID that is obtained from a Rendezvous Service. In an example, the New Device 720 returns a resource (e.g., /doxm resource) with parameters helpful in determining if the device is not yet onboarded. If the device implements a temporary identifier and supports zero-touch onboarding, the deviceuuid value is the same as the onboarding UUID that the platform makes available to the OCF Device. In various examples, these and other communications may be TLS exchanges as part of an HTTPS or COAPS protocol having an Object Security for Constrained RESTful Environments (OSCORE) binding. Further, such communications may occur over an OSCORE tunnel through one or more networks and domains.

In an example, subsequent to IF_C, the New Device 720 may have been provisioned with an asymmetric or symmetric key (or both) with which to perform the ZTOTM procedure. A keyid is used to reference the key (or key pair) used during the ZTOTM session establishment. The keyid is supplied to a TLS HelloVerify( ) hint parameter enabling the Onboarding Service 710 to locate the correct key used to protect the ClientHello( ) message. The Onboarding Service 710 selects the type of key (symmetric or asymmetric) implicitly when the ClientHello( ) algorithm is selected. Thus, FIG. 8 and FIG. 9 shows the ZTOTM sequences for both asymmetric and symmetric key types, respectively.

Figure 8:
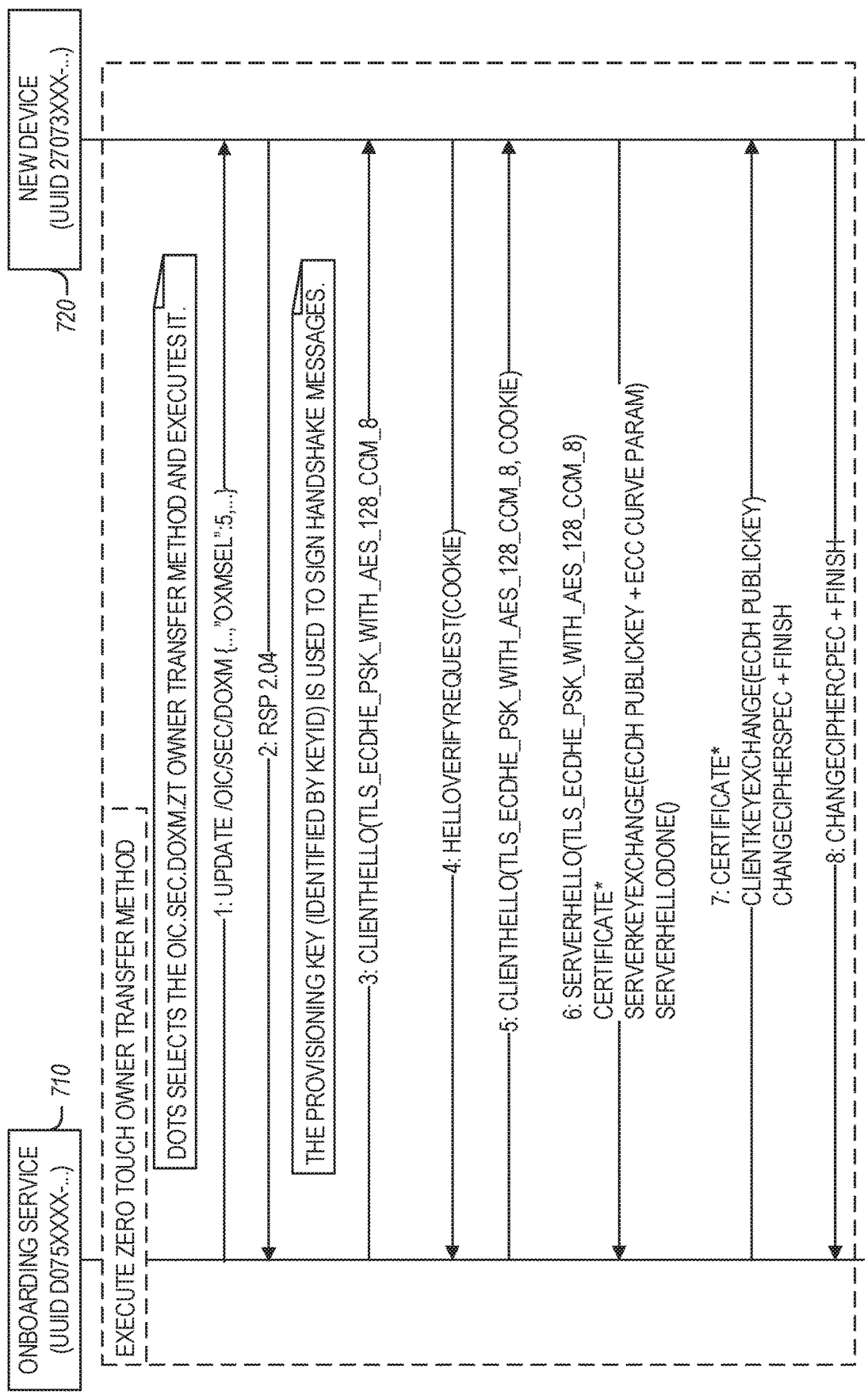
FIG. 8 illustrates a swim-lane messaging diagram for executing a zero-touch owner transfer technique, applied in an OCF implementation involving asymmetric keys, according to an example.

FIG. 8 illustrates a swim-lane messaging diagram for an example procedure of executing a zero-touch owner transfer technique, applied in an OCF implementation involving asymmetric keys. In the first and second communications, depicted in FIG. 8, the Onboarding Service 720 selects the zero-touch OTM by updating the oxmsel property of the /doxm resource. In the third and sixth communications, the Onboarding Service 720 chooses an asymmetric ciphersuite which the device uses to identify the asymmetric key that was provisioned during IF_C. The CertificateRequest contains the Onboarding Service 720 or its local root CA in the certificate_authorities list. Finally, in the seventh and eighth communications, the Onboarding Service 710 supplies its self-signed certificate or the certificate chain containing the local root CA.

Figure 9:
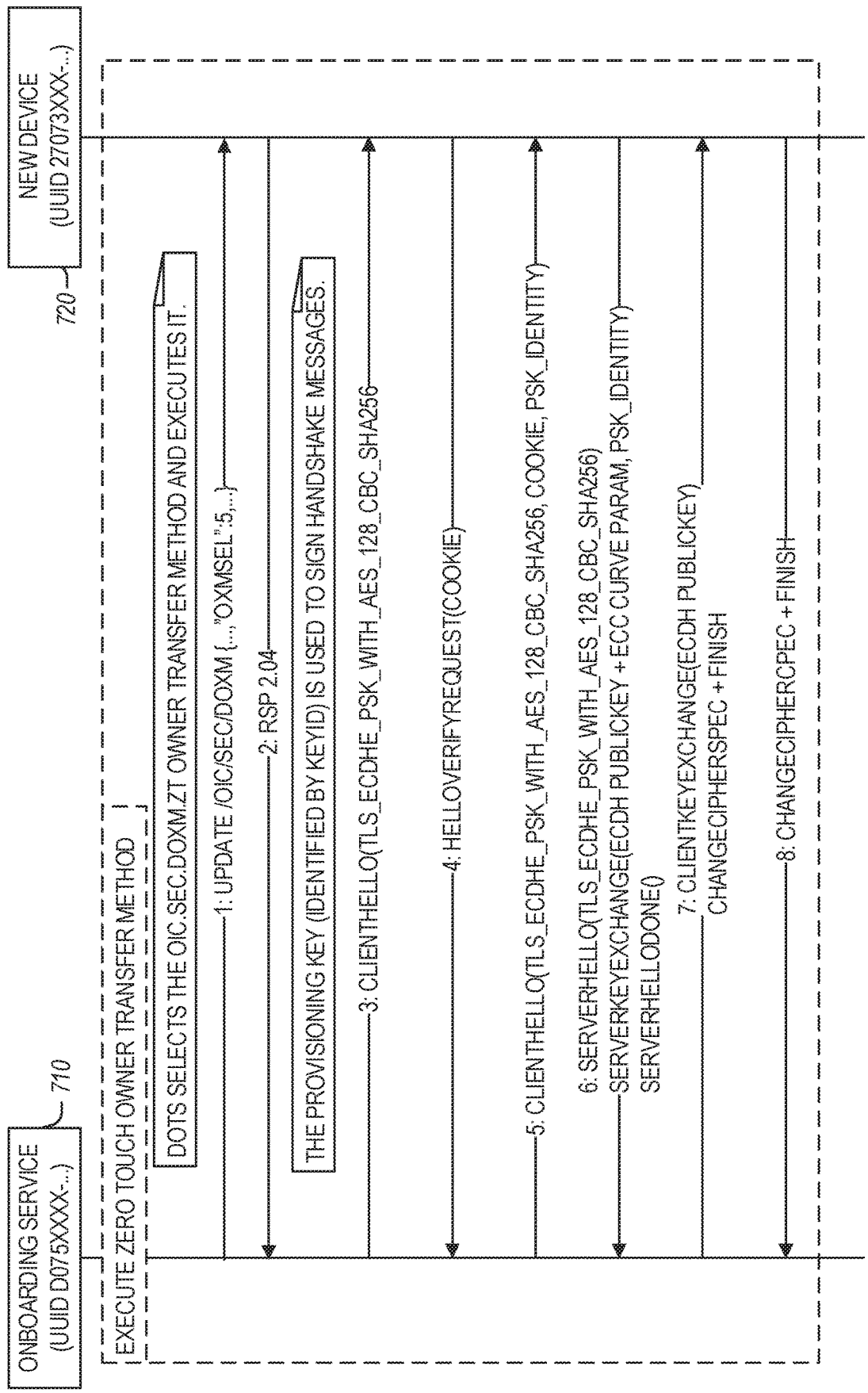
FIG. 9 illustrates a swim-lane messaging diagram for executing a zero-touch owner transfer technique, applied in an OCF implementation involving symmetric keys, according to an example.

FIG. 9 illustrates a swim-lane messaging diagram for example procedure of executing a zero-touch owner transfer technique, applied in an OCF implementation involving symmetric keys. In the first and second communications, depicted in FIG. 9, the Onboarding Service 710 selects the ZTOTM procedure by updating the oxmsel property of the /doxm resource. In the third and eighth communications, the onboarding service chooses a symmetric ciphersuite which the device uses to identify the symmetric PSK that was provisioned during IF_C. The psk_identity value is a key identifier used by both sides to locate the PSK to be used during ZTOTM.

In various examples, the manufacturer is responsible for securely embedding the platform attestation private key, onboarding UUID and for protecting signing and verification operations associated with the ZTOTM procedure with sufficient degree of assurance that these values and operations cannot be compromised. To accomplish this, a platform manufacturer issues the onboarding certificate and signs the manifest containing the supply chain entity public key that is responsible for constructing the next manifest entry.

Manufacturer and supply chain entities are responsible for protecting their respective private keys used when signing the manifest.

In an example, the ZTOTM procedures discussed herein may use a variety of the following types of (D)TLS cipher suites, such as:

TLS_ECDHE_PSK_WITH_AES_128_CBC_SHA256,
TLS_ECDHE_PSK_WITH_AES_256_CBC_SHA256,
TLS_ECDHE_ECDSA_WITH_AES_128_CCM_8,
TLS_ECDHE_ECDSA_WITH_AES_128_CCM, or
TLS_ECDHE_ECDSA_WITH_AES_256_CCM

Figure 10:
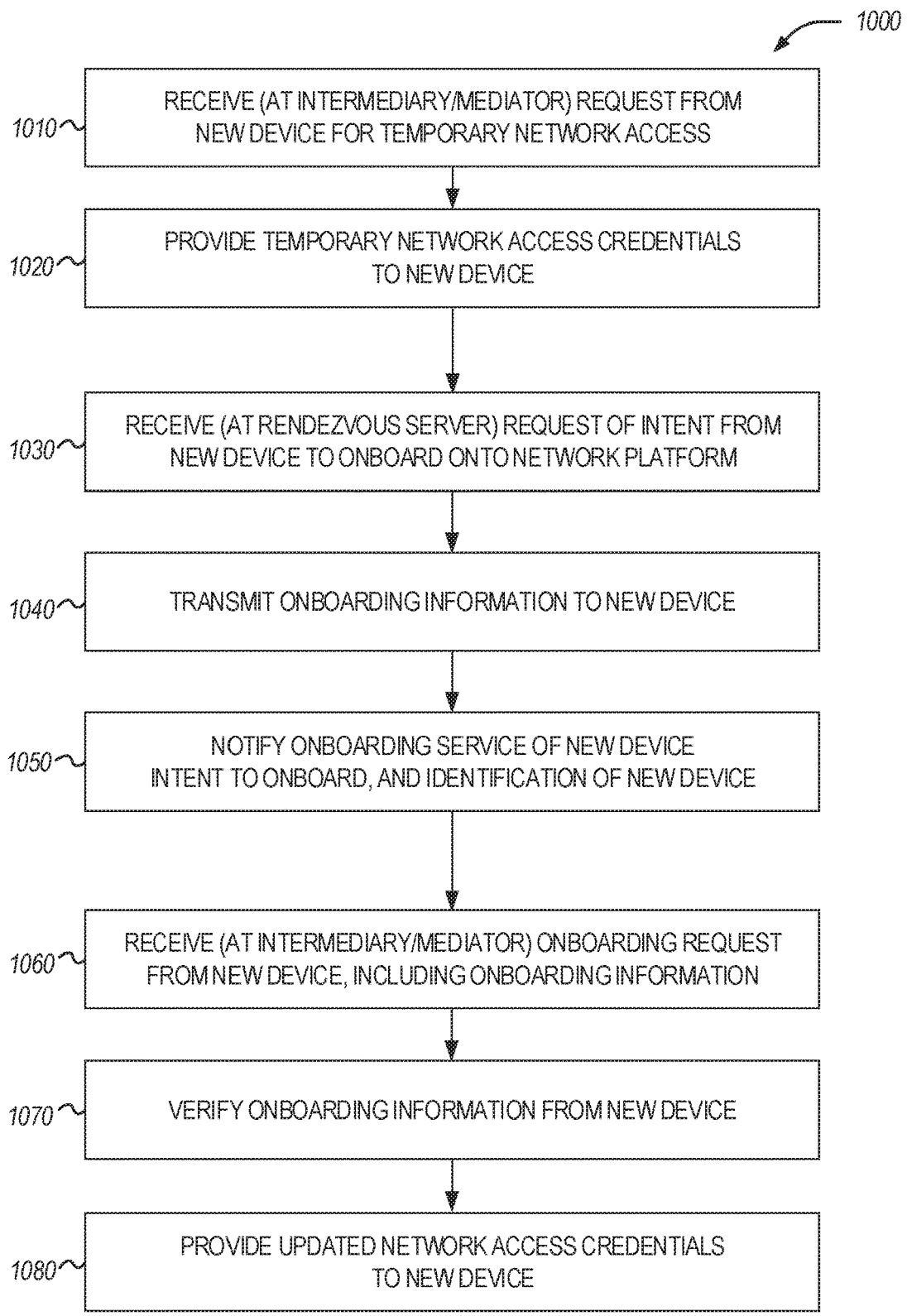
FIG. 10 illustrates a flowchart of a method for performing an onboarding technique, according to an example.

FIG. 10 illustrates a flowchart 1000 of an example method for performing an onboarding technique. The operations of the flowchart 1000 may be performed by aspects of a mediator service (e.g., intermediary/proxy device operating a mediator service), a rendezvous service (e.g., server operating a rendezvous server), or onboarding tool (e.g., server operating a device owner transfer service) of a network platform. In an example, this network platform operates according to an Open Connectivity Foundation (OCF) specification (e.g., based on OCF Specification version 2.0, dated Jun. 21, 2018, or an equivalent earlier or later released version configuration). In particular, the operations described below are provided with reference to the mediator service and rendezvous server, but it will be understood that other entities and services may also perform or coordinate such actions.

The flowchart 1000 begins with operations at 1010 to receive a request from a new device for temporary network access. For instance, this request may request to begin or commence an onboarding procedure with a network platform/network service. In response to this request, temporary network access credentials are transmitted to the new device at 1020. In an example, these credentials may be provided as part of rendezvous service information transmitted to the new device, as the rendezvous service information is usable by the new device to connect to the rendezvous service via the first network. Further, in an example, the first request, the rendezvous service information, and the credentials of the first network are exchanged in secure communications using a software access point hosted by the new device. In another example, the first request, the rendezvous service information, and the credentials of the first network are provided in the discovery beacon using a software access point hosted by the mediator service device.

The flowchart 1000 continues with operations 1030-1050, from the perspective of the rendezvous server, involving: receiving a request at 1030, with the request indicating intent from the new device to onboard onto the network platform; transmitting initial onboarding information to the new device at 1040; and notifying an onboarding service (e.g., onboarding server) of the network platform, at 1050, of the new device intent to onboard from the new device, and the identification of this device. In an example, the initial onboarding information provided to the new device includes an address of the onboarding server. Also in an example, initial onboarding information is exchanged between the onboarding server and the rendezvous service. In still a further example, the rendezvous service is a cloud-hosted service, and the rendezvous service utilizes a manifest to verify a device owner for the onboarding procedure, such as to identify the appropriate onboarding tool or service that the new device is to be onboarded onto.

The flowchart 1000 continues with operations, from the perspective of the mediator service or intermediary entity, involving: receiving a second onboarding request from a new device at 1060, which includes the initial onboarding information; verifying the initial onboarding information from the new device at 1070; and providing updated network access credentials to the new device at 1080, in order to transmit credentials of a second network to the new device. The second network is, in turn, usable by the new device to connect with an onboarding server and perform (or complete) the onboarding procedure with the network platform. In an example, the initial onboarding information verified by the mediator service includes the identifier of the new device and a nonce, such as for identifier and nonce that are also exchanged between the rendezvous service to the onboarding service.

In an example, the credentials of the first network and the second network comprise respective settings for communications over wireless networks operating according to a Wi-Fi network specification (e.g., a specification of an IEEE 802.11 standards family). Also in an example, the network access to begin the onboarding procedure and the network access to continue the onboarding procedure are conducted via the mediator/intermediary device operating as a proxy to the first network and to the second network.

In a further example, the first network is an entrusted network that is isolated from the second network, and the rendezvous service verifies identification information associated with the new device prior to providing the initial onboarding information to the new device. Also in a further example, the second network is a sandbox network used to complete the onboarding procedure with the network platform; however, the onboarding server provides credentials of a third network for production network access for the new device to perform device service operations within the network platform.

Figure 11:
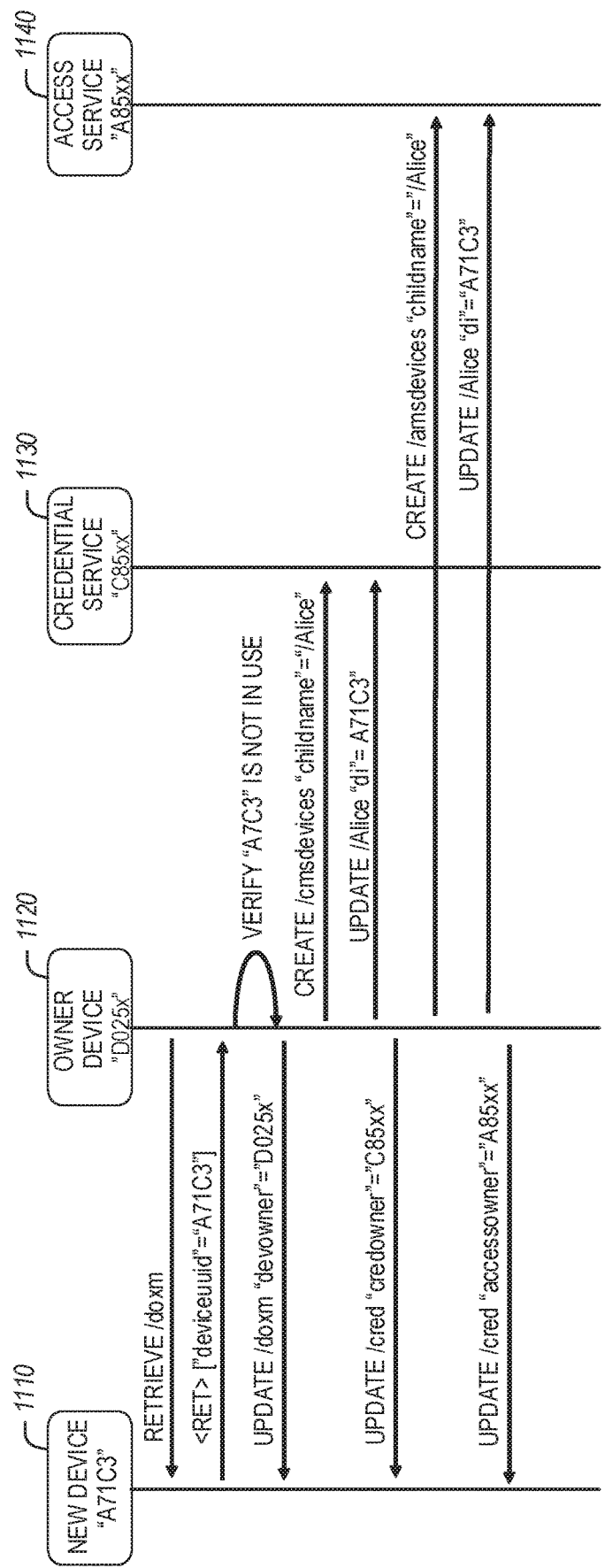
FIG. 11 depicts an example scenario for onboarding performed with an owner device, credential service, and access service, according to an example.

FIG. 11 depicts an example scenario for onboarding of a subject device 1110 performed with an owner device 1120, credential service 1130, and access service 1140. An onboarding process performed in an IoT deployment (e.g., in an OCF network deployment) is often implemented similar to the manner depicted in FIG. 11. As shown, the owner device 1120 may retrieve the unique device UUID from the new device 1110 and verify that there are no duplicates. Then the owner device 1120 creates a user-friendly device name and associates the device identifier to the one just received. This information is conveyed to the services associated with the IoT device such as credential services 1130 or access services 1140. As a result, the new device 1110 can connect with those services with the claimed identity.

An important issue with the system depicted in FIG. 11, is the authenticity and validity of the original device identifier, even as the privacy of this identifier is not preserved. As discussed herein, such onboarding approaches (and other IoT network system operations) may be enhanced through the use of a blockchain approach to maintain a self-sovereign identity.

Figure 12:
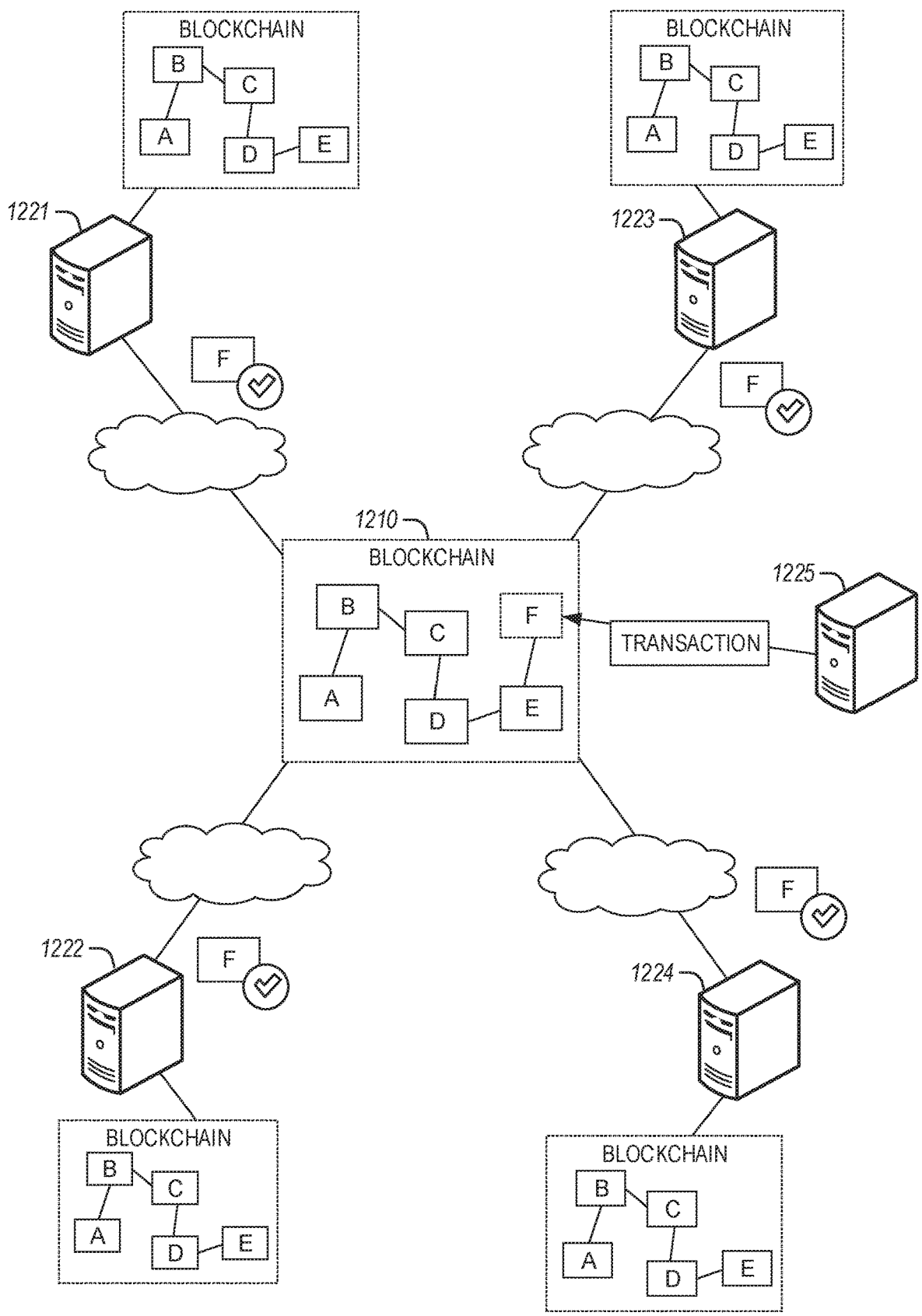
FIG. 12 illustrates a blockchain system implementation, according to an example.

FIG. 12 illustrates a blockchain system implementation, according to an example. As is understood, a blockchain is a distributed database (e.g., distributed ledger) that maintains a growing list of data records that are hardened against tampering and revision. A blockchain (e.g., chain 1210) includes "blocks," which hold data or both data and programs. Each block holds batches of individual "transactions" between blockchain participants. Each block includes a timestamp and linking information (usually a hash value) linking the current block to the previous block; the linking information allows traversal of the blockchain (in either direction).

Blockchain transactions are integrity protected using a distributed hashing algorithm that requires each transaction processor (e.g., "miner", as shown with miners 1221, 1222, 1223, 1224) to agree to the next block in the blockchain (e.g., provided as a result of transaction by participant 1225). Integrity is achieved through a consensus of multiple miners 1221, 1222, 1223, or 1224, each miner 1221, 1222, 1223, or 1224 having access to its own copy of the blockchain 1210, which is also referred to as a distributed ledger. If a majority of the miners 1221, 1222, 1223, or 1224 agree on the contents of the ledger, then those agreed upon contents become the "truth" for the ledger; the miners 1221, 1222, 1223, or 1224 that disagree will accept the truth of the majority (otherwise, they would not be able to function). Integrity is provable because an attacker would have to compromise a majority of miners and modify their copies of the ledger; this is extremely difficult (if not impossible).

Figure 13:
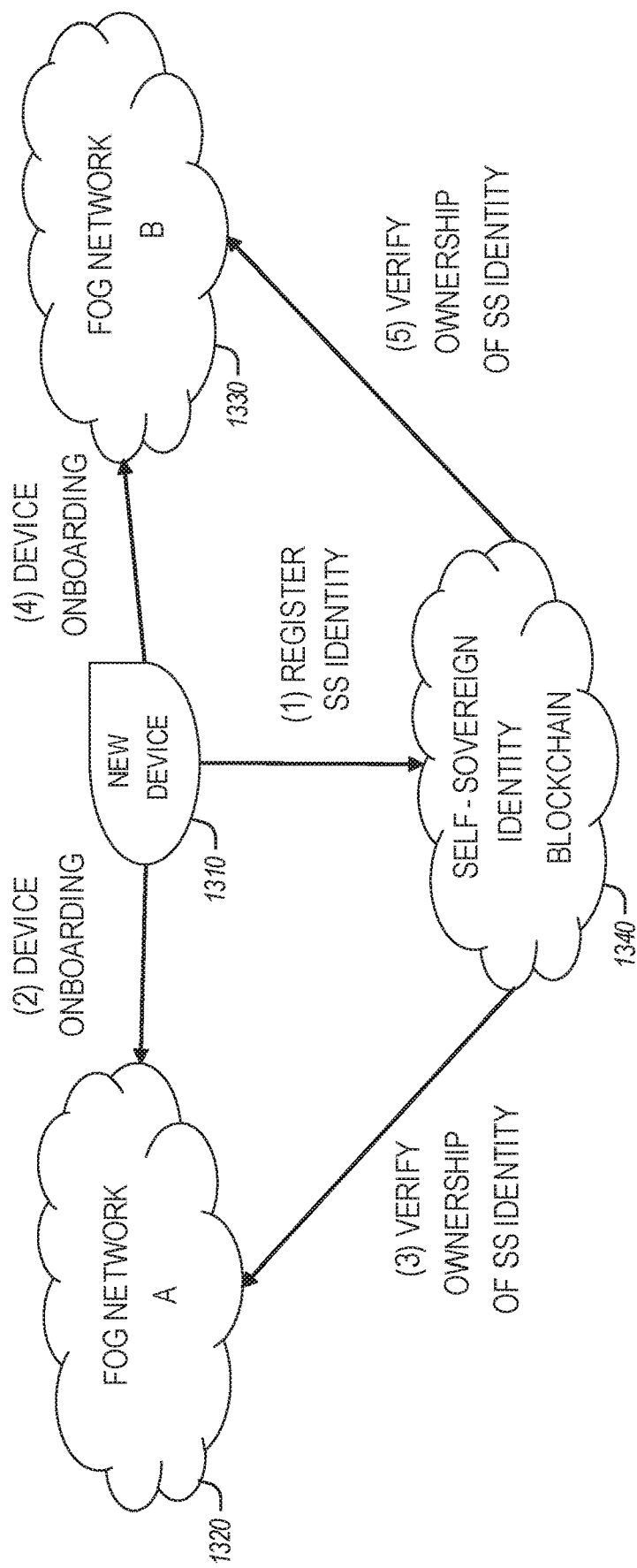
FIG. 13 illustrates a scenario involving a blockchain and Self Sovereign Identity management, in an IoT network deployment, according to an example.

FIG. 13 depicts an example use case scenario involving a blockchain and a Self Sovereign Identity (SSI). As shown, a device 1310 may be onboarded to one or more fog networks 1320, 1330, as these fog networks verify the ownership of the SSI. After the device 1310 registers its SSI to the blockchain 1340 (operation 1), this identity and registration information is readable and verifiable at a later time by either fog network 1320, 1330.

Figure 14:
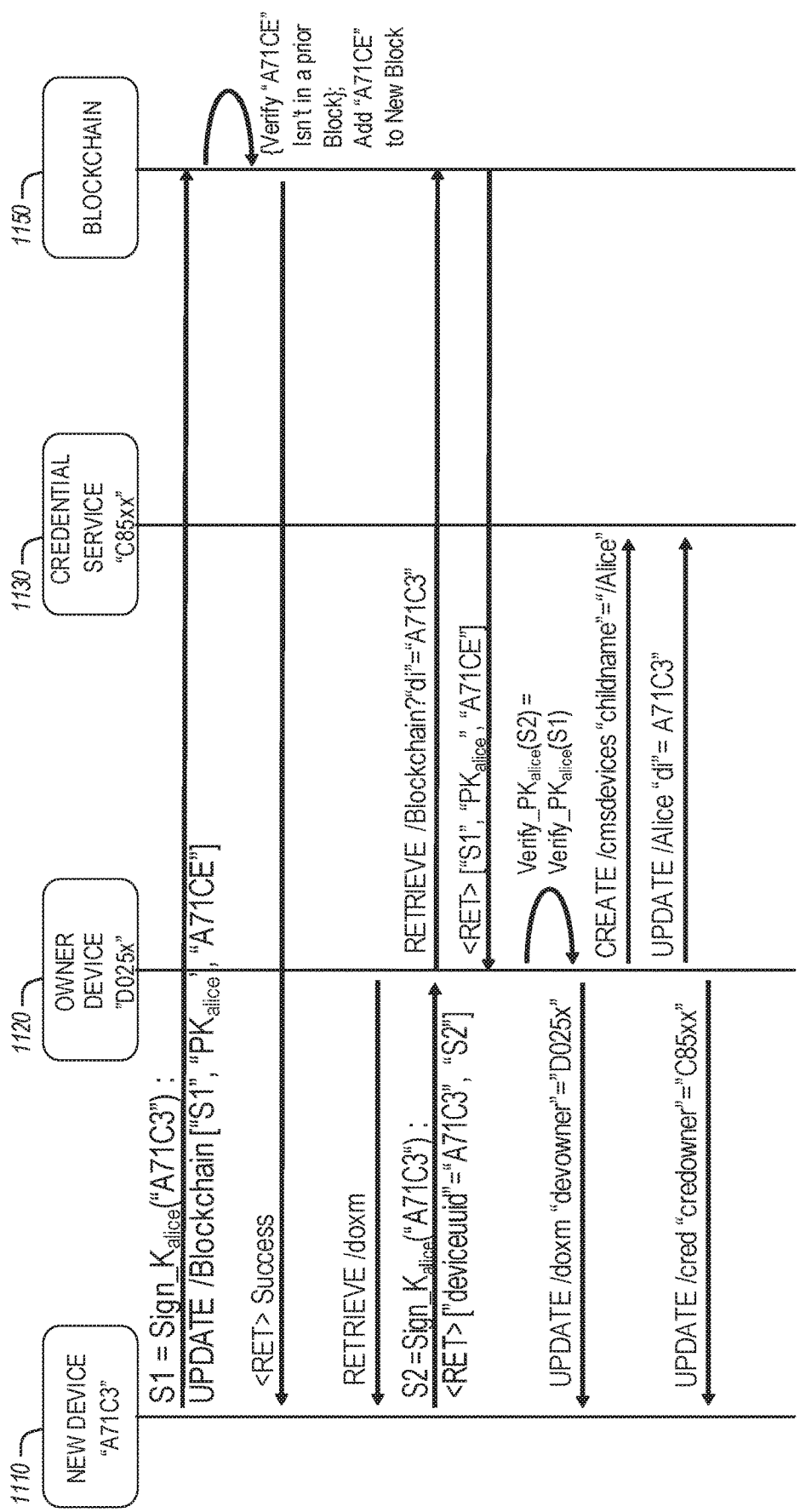
FIG. 14 illustrates a flow diagram illustrating Self Sovereign Identity registration with a blockchain, according to an example.

FIG. 14 illustrates a flow diagram illustrating SSI registration of the new device 1110 with a blockchain 1150. As illustrated in FIG. 14, the new device 1110 itself is responsible for signing with its private signing key and the claimed device identity and the associated public key. The blockchain 1150 checks for duplicate identities and adds the identity to a new block. Then, as part of the onboarding process the owner device 1120 retrieves the signature and information to query the device identity from the blockchain 1150. At this point the owner device 1120 can verify the authenticity of the new device's identity claim and, similar to the flow above, the blockchain 1150 informs relevant services (e.g., credential service 1130) about this new device identity which can be used to communicate to the new device 1110. If there is a duplication, then the owner device 1120 will verify with the blockchain 1150 and also check against the authenticity of those signatures. After the conflict resolution, the new device 1110 obtains the updated owner device information and then may connect to services.

The device ID in FIG. 14 provides an example of an identity attribute that can be used for correlation attacks. As will be understood, privacy of the owner/user may be compromised if the device ID is used to correlate transactions belonging to the owner/user. Even if the owner is careful in terms of how the device ID is used, it is possible that a second owner of the same device could retain the same device ID that is misused or used for illicit purposes. Subsequently, all the first owner's legitimate transactions may be called into question because they can now be correlated or associated with the second owner's illicit transactions—implying the two owners have had at some point a common connection (e.g. business interaction resulting in the change of ownership of the device).

Thus, owner after owner, the device can be potentially tracked, compromising privacy as well as introducing potential security risks (data confidentiality, malware etc.) with targeted attacks to specific owners of "new devices." As discussed further in the following paragraphs, the blockchain implementation of FIGS. 13 and 14 may be extended to involve IoT transactions performed among participants to enable use of zero knowledge commitments, and zero knowledge proof of knowledge of verification, using information written to the blockchain 1150.

The use of the following methods and cryptographic protocols allow for a privacy preserving onboarding of IOT devices such that the devices cannot be tracked between multiple owners but at the same time allow for the high assurance verification of the IOT device identity and other device attributes to allow for secure on-boarding by the new owner. This also ensures correctness and duplicate detection even as the private information is not revealed in the clear.

In an example, this security approach is based on the ability to carry out zero knowledge proofs versus the traditional RSA or Elliptic-Curve signatures in order to have a privacy protected registration of the new devices. Typically, a zero knowledge proof consists of 2 steps—(1) commitment of secret data (e.g. device identifier, could also be other attributes such as group membership, location, year of manufacturing etc.) and (2) proof of knowledge of the secret data. The cryptographic protocol is described below first followed by the end-to-end description of a privacy preserving registration flow using those cryptographic primitives.

In an example, zero knowledge commitments may be utilized as follows. To be able to create proof on an identifier m, the device creates a Pedersen's commitment of the form $M = g_1^m h_1^r$ where r is a random value chosen by the user and $g_1$ and $h_1$ are public parameters of the registrar. This commitment is enrolled at the blockchain. At enrollment the blockchain signs the commitment M to output $\sigma = M^{102}$ as the signature where $\chi$ is the secret key of the blockchain (e.g., a semi-permissioned blockchain, such as a ChainAnchor implementation).

In a further example, a semi-permissioned blockchain enables a device to be placed through some vetting to be admitted to blockchain community, but allows devices to retain anonymity by presenting a credential to assert that the devices are a member of the community (while staying anonymous). Thus, transactions may be signed with a key that provides anonymity to the members of the chain. This assumes the community is of sufficient size that it is impractical to perform an exhaustive search of all transactions correlated to the community and thereby deduce the identity of one of its members.

In an example, a Zero Knowledge Proof of Knowledge (ZKPK) or Verification procedure may perform a verification as follows. Let $\sigma_1, \sigma_2, \ldots, \sigma_t$ be the signatures corresponding to the identifiers that need to be proved by the device to the new device owner. At the time of registration the device aggregates the signatures into $$\sigma = \prod_{i=1}^{t} \sigma_i,$$

where $\sigma_i$ is the signature of committed value $M_i = g_1^{m_i} h_1^{r_i}$.

As a further example, this may include only one signature if only one secret device identifier or group membership has to be proven. However, this technique may be generalized to a set of attributes for cases where the registration requires not only a device identity but other attributes of the device. These attributes are included as part of the zero knowledge proof to avoid information leakage while satisfying the registration consideration.

The new device then computes $$M = \prod_{i=1}^{t} M_i = g_1^{m_1 + \ldots + m_{t}} h_1^{r_1 + \ldots + r_t}.$$

The user sends σ, M, $M_i$, 1≤i≤t to the verifier (which is the device owner).

As a next step the new device and the verifier carry out the following ZKPK protocol (using a convention where Greek letters denote quantities the knowledge of which is being proved, whereas all the other parameters are sent to the verifier):

$$PK\{(\alpha,\beta): M = g_1^{\alpha} h_1^{\beta}, \alpha, \beta \in Z_q\}$$

After the verifier accepts the zero-knowledge proof of the commitments, the verifier checks if the following verifications succeed:

$$M = \prod_{i=1}^{t} M_i \text{ and } e(\sigma, g_2) = e(M, v)$$

where $g_2$ is a public parameter, v is the public key of the registrar, and e is a bilinear mapping. If the last step succeeds then the verifier accepts the ZKPK of the signed commitments.

Figure 15:
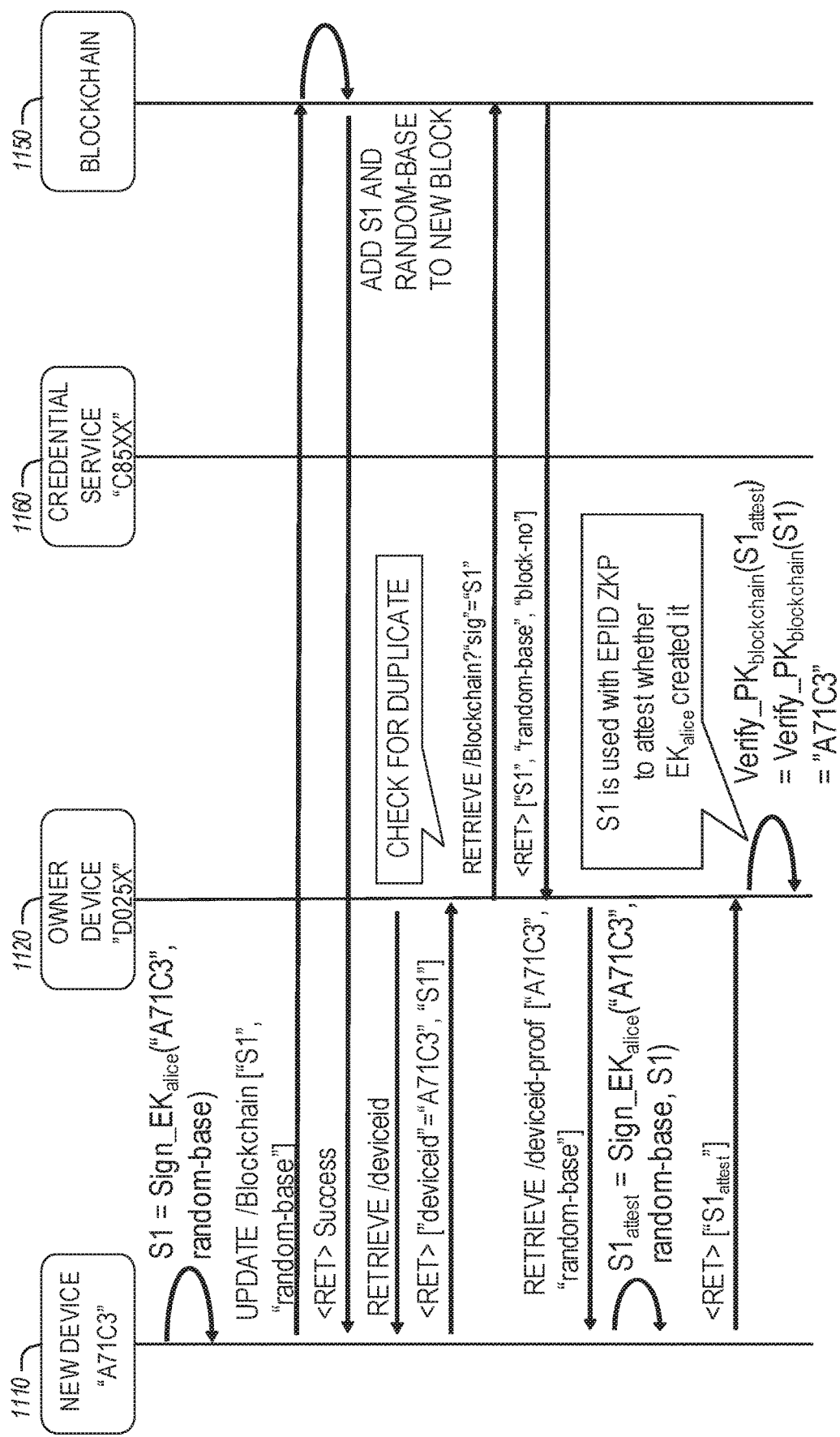
FIG. 15 illustrates a privacy protected Self Sovereign Identity registration flow with a blockchain, implementing a cryptographic protocol, according to an example.

FIG. 15 illustrates a privacy-protected SSI registration flow, implementing the cryptographic protocol described above. As shown, first the new device 1110 creates the signed commitment. In this example only one signed attribute, which is the device identifier ("A71C3"), is considered. This commitment is submitted to the blockchain 1150 as a new block.

After this addition to the blockchain 1150, the device owner 1120 will be the verifier of this commitment when the new device 1110 claims ownership of the commitment. For simplicity, FIG. 15 shows the device owner 1120 retrieving the commitment from the blockchain 1110, but since the commitment is are signed, this information can potentially be provided by the new device 1110 itself (such as in a scenario where blockchain information is offline). This commitment can be checked for duplicates within the device owner's system. After the commitment is checked, then the owner device 1120 is the verifier and carries out the ZKPK protocol to ensure that the secret identifier is known to the new device and that it can prove ownership with the signature verification. This verification is different for different owners and cannot be used to link different transactions (registrations), thus preserving privacy and also ensuring authenticity.

In a further example, more than one attribute can be used to verify and associate with a device in a similar fashion. This will allow for a comprehensive fine granular on-boarding of IoT devices and various types of edge, Multi-Access edge computing (MEC), cloud, and networked entities involving the deployment of manufactured "smart" goods, while preserving the privacy of all the attributes that are verified as part of the process.

Figure 16:
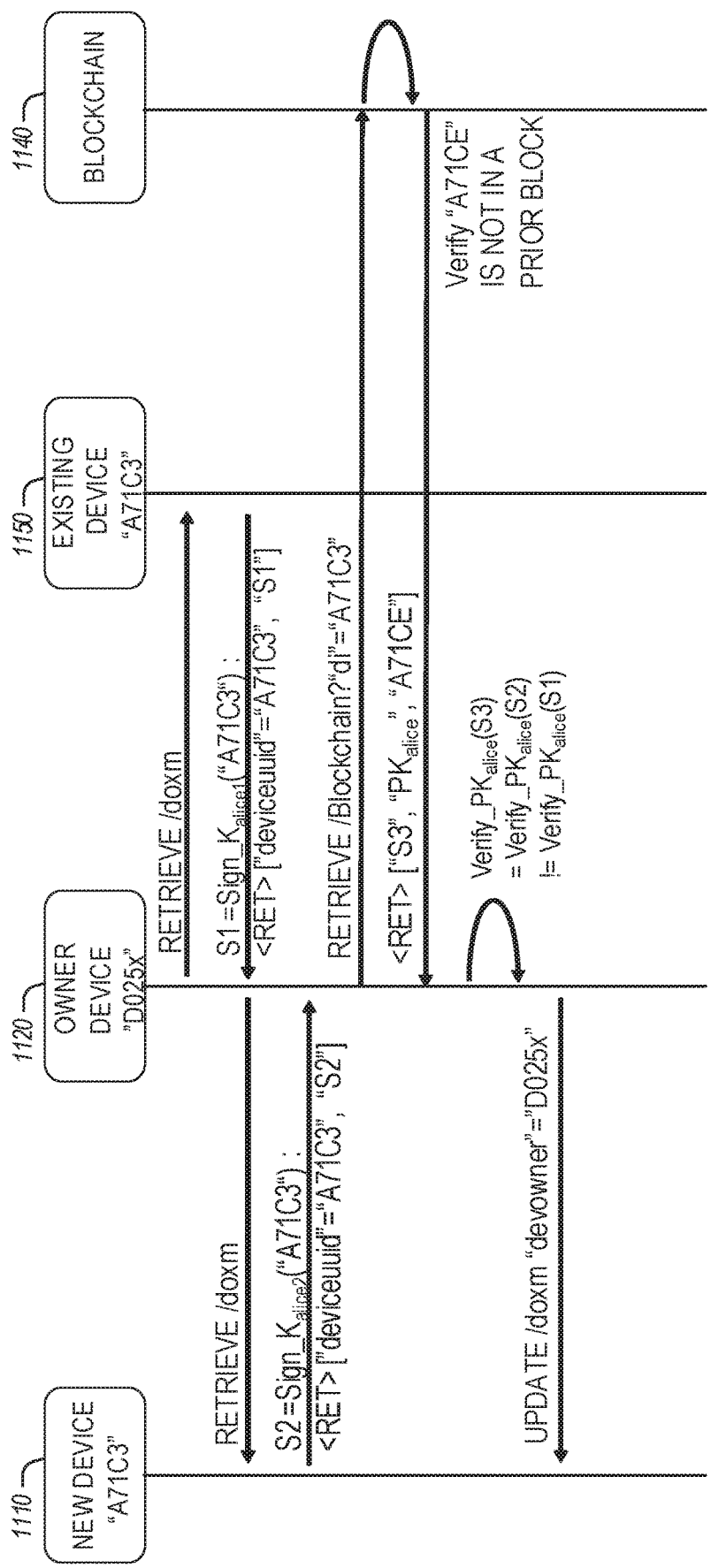
FIG. 16 illustrates a flow diagram, depicting Self Sovereign Identity conflict resolution with a blockchain, without a privacy protected flow, according to an example.
Figure 17:
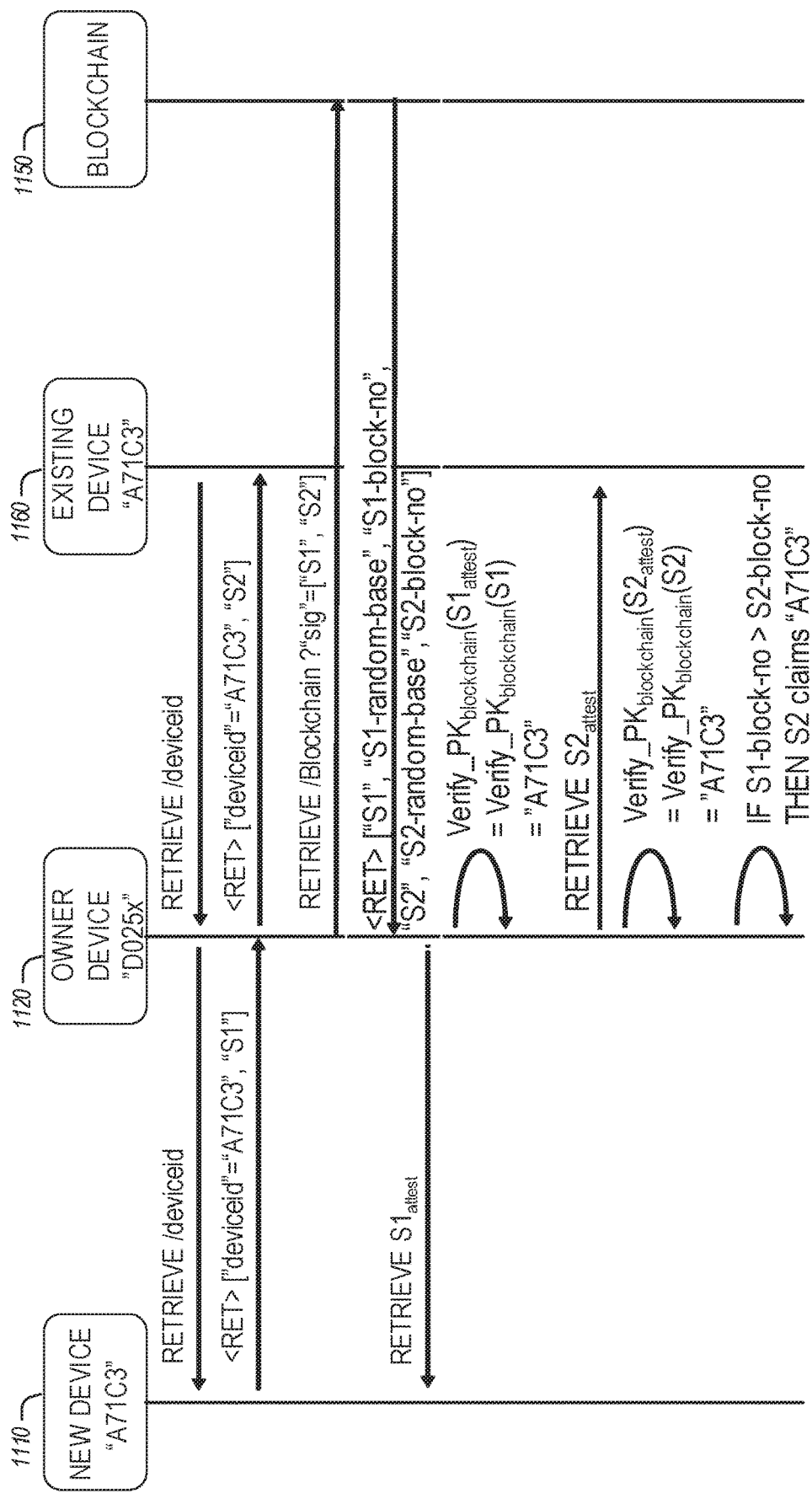
FIG. 17 illustrates a flow diagram, depicting Self Sovereign Identity conflict resolution with a blockchain, using a privacy protected flow, according to an example.

In further examples, the blockchain approaches discussed herein may also be applied to use cases involving SSI conflict resolution. In an example, FIG. 16 illustrates a flow diagram, in which SSI conflict resolution occurs to a blockchain, without a privacy flow (e.g., without the use of a zero knowledge proof). FIG. 17 illustrates a scenario in which SSI conflict resolution occurs, but with a privacy protected variation (e.g., with use of a zero knowledge proof). Thus, the blockchain and zero knowledge techniques discussed herein may be applied to a variety of IoT information management features.

In still further examples, the techniques discussed herein may be used in connection with a sigma protocol which is implemented to enable the use of device identifier revocation (e.g., EPID revocation). Information to identify and maintain a revocation list (or other information related to the revocation of credentials or identifiers) may be stored on a blockchain using the techniques discussed herein. Moreover, any number of techniques to enable information relevant to revocation, association, registration, or device property management may be stored and verified on a blockchain in a privacy-secure manner using the techniques discussed herein.

Figure 18:
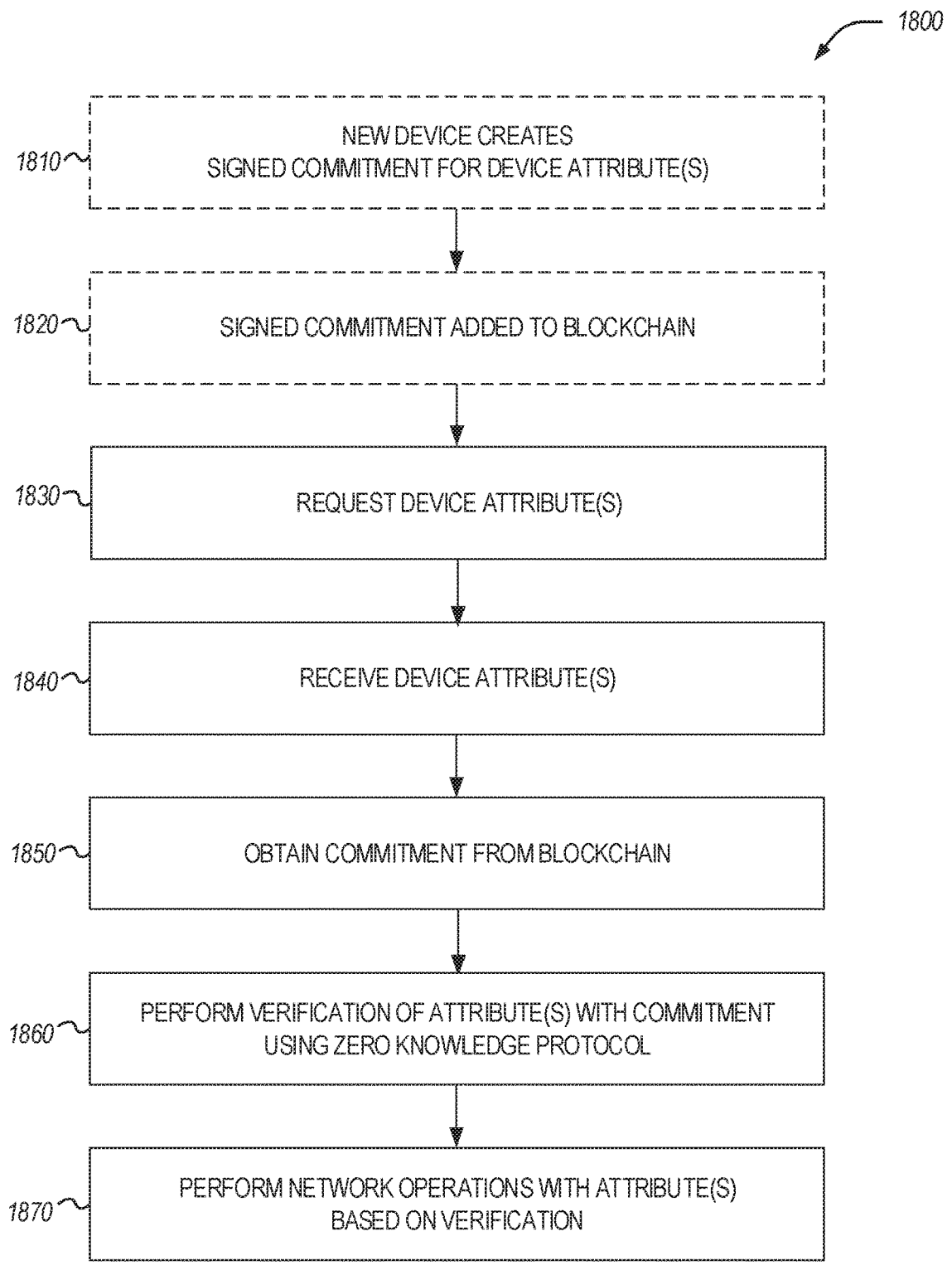
FIG. 18 illustrates a flowchart of a method for device attribute registration and verification using a blockchain, according to an example.

FIG. 18 illustrates a flowchart 1800 of a method for device attribute registration and verification using a blockchain. In an example, the operations of the flowchart 1800 may be performed by an owner device, such as in connection with device registration or device management services in scenarios such as those discussed above. However, all or a portion of the operations of the flowchart 1800 may be performed by other entities in a networked environment for purposes of information verification while protecting privacy.

In the flowchart 1800, precondition operations include the creation of a signed commitment from one or more subject device attributes (operation 1810), and the addition of the signed commitment to a blockchain ledger (operation 1820). This commitment may be established and registered as suggested in the examples above.

The flowchart 1800 then continues with request-verification operations based on the commitment. First, the verifying device (e.g., an owner device) requests the subject device attributes from an entity such as the subject device (operation 1830) and receives the proffered subject device attributes from the requested entity such as the subject device (operation 1840). Next, the verifying device obtains a commitment from a blockchain (operation 1850), or alternately, obtains a signed commitment as offered by the subject device or another accessible entity.

The flowchart 1800 then proceeds with performing a verification of the subject device attributes, using the commitment within a zero knowledge protocol (operation 1860). Based on this verification, the verifying device can determine whether the requested/received device attributes are valid, without having the device attribute become publicly available or advertised. Finally, network operations may be performed using the subject device attributes (operation 1870), based on a successful verification outcome.

In various examples, the operations and functionality described above with reference to FIGS. 3-18 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 19:
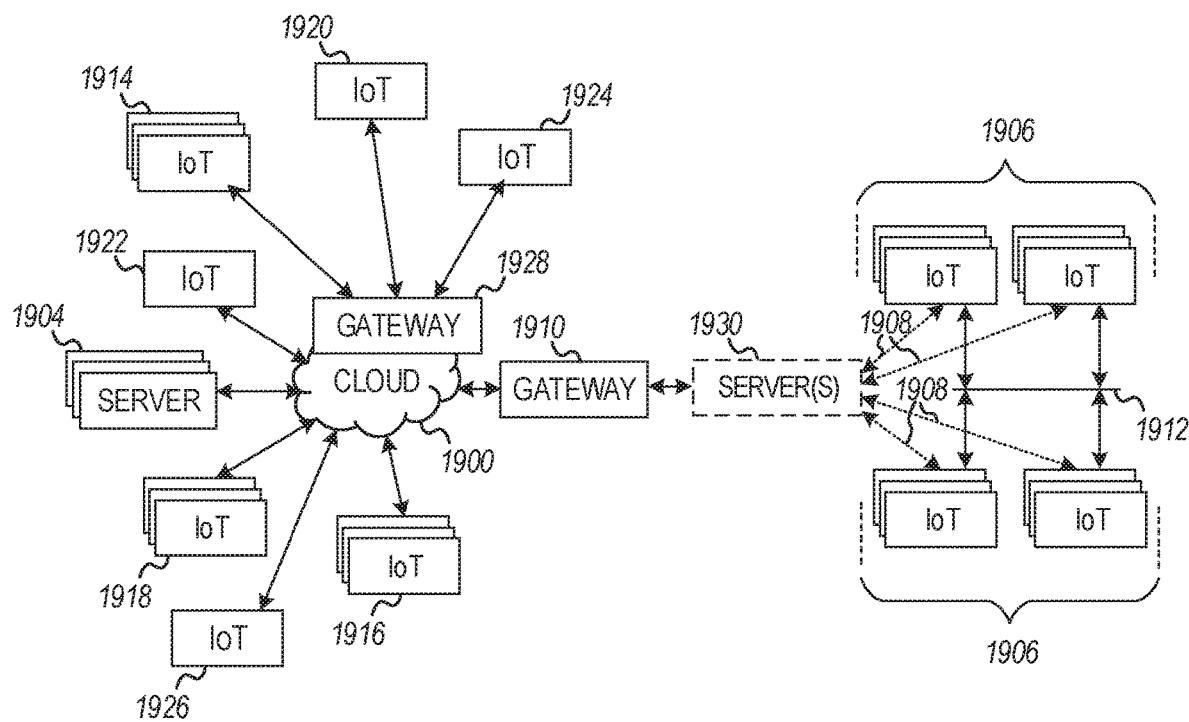
FIG. 19 illustrates a block diagram of a network illustrating communications among a number of IoT devices, according to an example.

FIG. 19 illustrates a drawing of a cloud computing network, or cloud 1900, in communication with a number of Internet of Things (IoT) devices. The cloud 1900 may represent the Internet, or may be a local area network (LAN), or a wide area network (WAN), such as a proprietary network for a company. The IoT devices may include any number of different types of devices, grouped in various combinations. For example, a traffic control group 1906 may include IoT devices along streets in a city. These IoT devices may include stoplights, traffic flow monitors, cameras, weather sensors, and the like. The traffic control group 1906, or other subgroups, may be in communication with the cloud 1900 through wired or wireless links 1908, such as LPWA links, optical links, and the like. Further, a wired or wireless sub-network 1912 may allow the IoT devices to communicate with each other, such as through a local area network, a wireless local area network, and the like. The IoT devices may use another device, such as a gateway 1910 or 1928 to communicate with remote locations such as the cloud 1900; the IoT devices may also use one or more servers 1930 to facilitate communication with the cloud 1900 or with the gateway 1910. For example, the one or more servers 1930 may operate as an intermediate network node to support a local edge cloud or fog implementation among a local area network. Further, the gateway 1928 that is depicted may operate in a cloud-to-gateway-to-many edge devices configuration, such as with the various IoT devices 1914, 1920, 1924 being constrained or dynamic to an assignment and use of resources in the cloud 1900.

Other example groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, with another IoT fog platform or system (not shown, but depicted in FIG. 2), or a combination therein. The groups of IoT devices may be deployed in various residential, commercial, and industrial settings (including in both private or public environments).

As may be seen from FIG. 19, a large number of IoT devices may be communicating through the cloud 1900. This may allow different IoT devices to request or provide information to other devices autonomously. For example, a group of IoT devices (e.g., the traffic control group 1906) may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

Clusters of IoT devices, such as the remote weather stations 1914 or the traffic control group 1906, may be equipped to communicate with other IoT devices as well as with the cloud 1900. This may allow the IoT devices to form an ad-hoc network between the devices, allowing them to function as a single device, which may be termed a fog platform or system (e.g., as described above with reference to FIG. 2).

Figure 20:
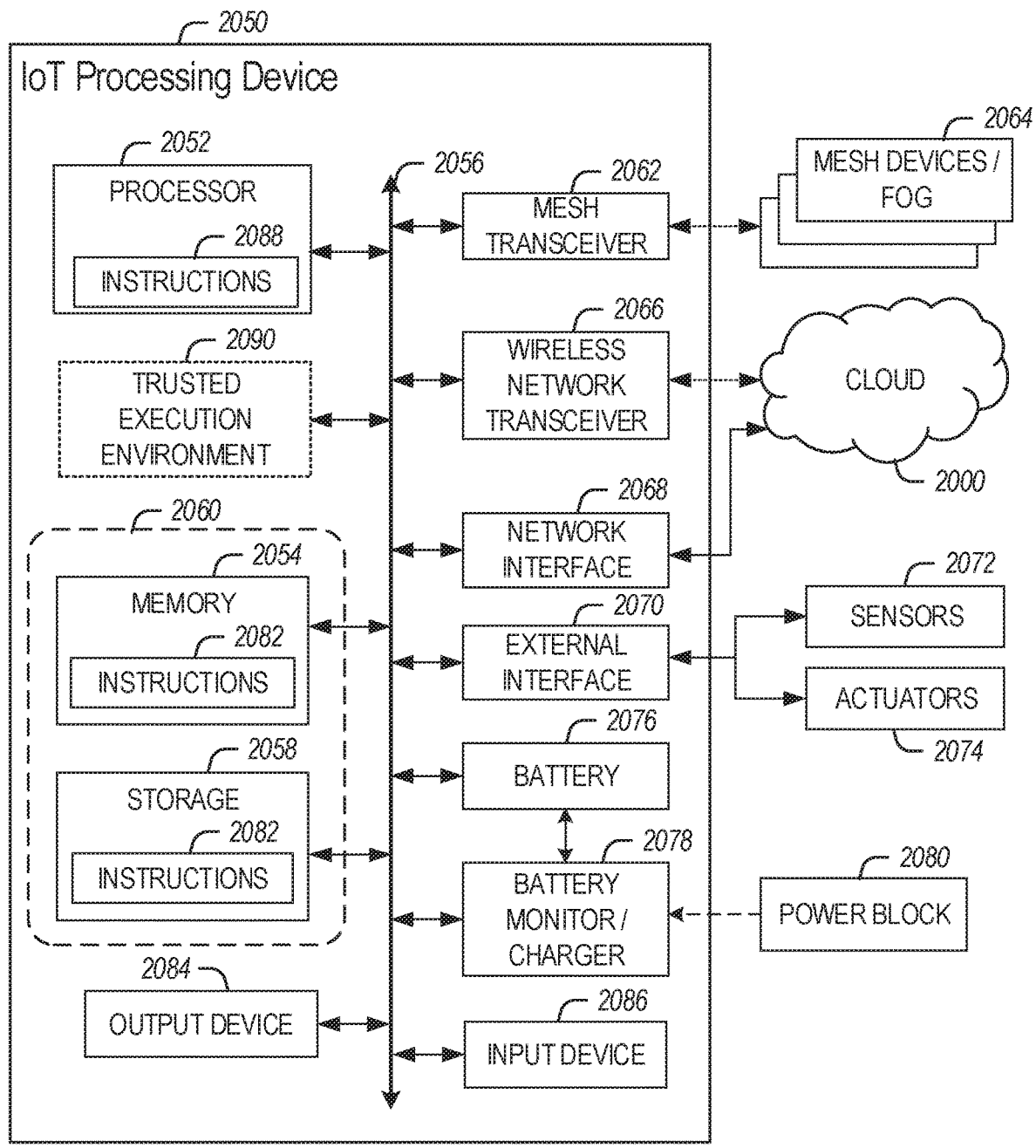
FIG. 20 illustrates a block diagram for an example IoT processing system architecture upon which any one or more of the techniques (e.g., operations, processes, methods, and methodologies) discussed herein may be performed.

FIG. 20 is a block diagram of an example of components that may be present in an IoT device 2050 for implementing the techniques described herein. The IoT device 2050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2050, or as components otherwise incorporated within a chassis of a larger system. Additionally, the block diagram of FIG. 20 is intended to depict a high-level view of components of the IoT device 2050. However, some of the components shown may be omitted, additional components may be present, and different arrangement of the components shown may occur in other implementations.

The IoT device 2050 may include processing circuitry in the form of a processor 2052, which may be a microprocessor, a multi-core processor, a multithreaded processor, an ultra-low voltage processor, an embedded processor, or other known processing elements. The processor 2052 may be a part of a system on a chip (SoC) in which the processor 2052 and other components are formed into a single integrated circuit, or a single package, such as the Edison™ or Galileo™ SoC boards from Intel. As an example, the processor 2052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 2052 may communicate with a system memory 2054 over an interconnect 2056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the interconnect 2056. In an example the storage 2058 may be implemented via a solid state disk drive (SSDD). Other devices that may be used for the storage 2058 include flash memory cards, such as SD cards, microSD cards, xD picture cards, and the like, and USB flash drives. In low power implementations, the storage 2058 may be on-die memory or registers associated with the processor 2052. However, in some examples, the storage 2058 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2056 may be a proprietary bus, for example, used in a SoC based system. Other bus systems may be included, such as an I2C interface, an SPI interface, point to point interfaces, and a power bus, among others.

The interconnect 2056 may couple the processor 2052 to a mesh transceiver 2062, for communications with other mesh devices 2064. The mesh transceiver 2062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2062 may communicate using multiple standards or radios for communications at different range. For example, the IoT device 2050 may communicate with close devices, e.g., within about 10 meters, using a local transceiver based on BLE, or another low power radio, to save power. More distant mesh devices 2064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2066 may be included to communicate with devices or services in the cloud 2000 via local or wide area network protocols. The wireless network transceiver 2066 may be a LPWA transceiver that follows the IEEE 802.15.4, or IEEE 802.15.4g standards, among others. The IoT device 2050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2062 and wireless network transceiver 2066, as described herein. For example, the radio transceivers 2062 and 2066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2062 and 2066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2068 may be included to provide a wired communication to the cloud 2000 or to other devices, such as the mesh devices 2064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2068 may be included to enable connect to a second network, for example, a NIC 2068 providing communications to the cloud over Ethernet, and a second NIC 2068 providing communications to other devices over another type of network.

Given the variety of types of applicable communications from device to another component or network, applicable communications circuitry used by the device may include or be embodied by any one or more of components 1262, 1266, 1268, or 1270. Accordingly, in various examples, applicable means for communicating (e.g., receiving, transmitting, etc.) may be embodied by such communications circuitry.

The interconnect 2056 may couple the processor 2052 to an external interface 2070 that is used to connect external devices or subsystems. The external devices may include sensors 2072, such as accelerometers, level sensors, flow sensors, optical light sensors, camera sensors, temperature sensors, a global positioning system (GPS) sensors, pressure sensors, barometric pressure sensors, and the like. The external interface 2070 further may be used to connect the IoT device 2050 to actuators 2074, such as power switches, valve actuators, an audible sound generator, a visual warning device, and the like.

In some optional examples, various input/output (I/O) devices may be present within, or connected to, the IoT device 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2050.

A battery 2076 may power the IoT device 2050, although in examples in which the IoT device 2050 is mounted in a fixed location, it may have a power supply coupled to an electrical grid. The battery 2076 may be a lithium ion battery, or a metal-air battery, such as a zinc-air battery, an aluminum-air battery, a lithium-air battery, and the like.

A battery monitor/charger 2078 may be included in the IoT device 2050 to track the state of charge (SoCh) of the battery 2076. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2078 may communicate the information on the battery 2076 to the processor 2052 over the interconnect 2056. The battery monitor/charger 2078 may also include an analog-to-digital (ADC) convertor that enables the processor 2052 to directly monitor the voltage of the battery 2076 or the current flow from the battery 2076. The battery parameters may be used to determine actions that the IoT device 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the IoT device 2050. A wireless battery charging circuit, such as an LTC4020 chip from Linear Technologies of Milpitas, Calif., among others, may be included in the battery monitor/charger 2078. The specific charging circuits chosen depend on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 2082 provided via the memory 2054, the storage 2058, or the processor 2052 may be embodied as a non-transitory, machine readable medium 2060 including code to direct the processor 2052 to perform electronic operations in the IoT device 2050. The processor 2052 may access the non-transitory, machine readable medium 2060 over the interconnect 2056. For instance, the non-transitory, machine readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above.

Also in a specific example, the instructions 2088 on the processor 2052 (separately, or in combination with the instructions 2088 of the machine readable medium 2060) may configure execution or operation of a trusted execution environment (TEE) 2090. In an example, the TEE 2090 operates as a protected area accessible to the processor 2052 for secure execution of instructions and secure access to data. Various implementations of the TEE 2090, and an accompanying secure area in the processor 2052 or the memory 2054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 2050 through the TEE 2090 and the processor 2052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations comprising: receiving a first request from a new device for network access to begin an onboarding procedure with a network platform; transmitting credentials of a first network to the new device, wherein a rendezvous service is accessible by the new device via the first network, and wherein the rendezvous service is usable by the new device to obtain initial onboarding information associated with the network platform; and receiving a second request from the new device for network access to continue the onboarding procedure, the second request including the initial onboarding information; and transmitting credentials of a second network to the new device, wherein an onboarding server of the network platform is accessible via the second network, wherein the onboarding server is usable by the new device to perform the onboarding procedure with the network platform.

In Example 2, the subject matter of Example 1 includes, the credentials of the first network and the second network being provided in respective settings for communications over wireless networks operating according to a specification of an IEEE 802.11 standards family.

In Example 3, the subject matter of Example 2 includes: transmitting rendezvous service information to the new device, the rendezvous service information usable by the new device to connect to the rendezvous service via the first network; wherein the first request, the rendezvous service information, and the credentials of the first network are exchanged in secure communications using a software access point hosted by the new device.

In Example 4, the subject matter of Examples 2-3 includes: transmitting rendezvous service information to the new device using a discovery beacon, the rendezvous service information usable by the new device to connect to the rendezvous service via the first network; wherein the first request, the rendezvous service information, and the credentials of the first network are provided in the discovery beacon using a software access point hosted by the device.

In Example 5, the subject matter of Examples 1-4 includes, the network access to begin the onboarding procedure and the network access to continue the onboarding procedure being conducted via the device operating as a proxy to the first network and to the second network.

In Example 6, the subject matter of Examples 1-5 includes, the second network being a sandbox network used to complete the onboarding procedure with the network platform, wherein the onboarding server further provides credentials of a third network for network access to continue device service operations within the network platform.

In Example 7, the subject matter of Examples 1-6 includes, the initial onboarding information including an address of the onboarding server, wherein an identifier of the new device is provided from the rendezvous service to the onboarding service.

In Example 8, the subject matter of Example 7 includes, the initial onboarding information further including the identifier of the new device and a nonce, wherein the initial onboarding information is used by the device to validate the second request for network access to continue the onboarding procedure.

In Example 9, the subject matter of Examples 1-8 includes, the rendezvous service being a cloud-hosted service, wherein the rendezvous service utilizes a manifest to verify a device owner for the onboarding procedure.

In Example 10, the subject matter of Examples 1-9 includes, the first network being an untrusted network that is isolated from the second network, wherein the rendezvous service verifies identification information associated with the new device prior to providing the initial onboarding information to the new device.

In Example 11, the subject matter of Examples 1-10 includes, the operations being performed as operations of a mediator service, wherein the onboarding server operates as a device owner transfer service (DOTS), and wherein the network platform operates according to an Open Connectivity Foundation (OCF) specification.

In Example 12, the subject matter of Examples 1-11 includes, the operations of the onboarding procedure being performed in connection with validation of the new device by the onboarding server using a self-sovereign identity blockchain.

Example 13 is a method for a zero-touch owner transfer method of onboarding, using operations performed by a device comprising: receiving a first request from a new device for network access to begin an onboarding procedure with a network platform; transmitting credentials of a first network to the new device, wherein a rendezvous service is accessible by the new device via the first network, and wherein the rendezvous service is usable by the new device to obtain initial onboarding information associated with the network platform; and receiving a second request from the new device for network access to continue the onboarding procedure, the second request including the initial onboarding information; and transmitting credentials of a second network to the new device, wherein an onboarding server of the network platform is accessible via the second network, wherein the onboarding server is usable by the new device to perform the onboarding procedure with the network platform.

In Example 14, the subject matter of Example 13 includes, the credentials of the first network and the second network being provided in respective settings for communications over wireless networks operating according to a specification of an IEEE 802.11 standards family.

In Example 15, the subject matter of Example 14 includes, transmitting rendezvous service information to the new device, the rendezvous service information usable by the new device to connect to the rendezvous service via the first network; wherein the first request, the rendezvous service information, and the credentials of the first network are exchanged in secure communications using a software access point hosted by the new device.

In Example 16, the subject matter of Examples 14-15 includes, transmitting rendezvous service information to the new device using a discovery beacon, the rendezvous service information usable by the new device to connect to the rendezvous service via the first network; wherein the first request, the rendezvous service information, and the credentials of the first network are provided in the discovery beacon using a software access point hosted by the device.

In Example 17, the subject matter of Examples 13-16 includes, the network access to begin the onboarding procedure and the network access to continue the onboarding procedure being conducted via the device operating as a proxy to the first network and to the second network.

In Example 18, the subject matter of Examples 13-17 includes, the second network being a sandbox network used to complete the onboarding procedure with the network platform, wherein the onboarding server further provides credentials of a third network for network access to continue device service operations within the network platform.

In Example 19, the subject matter of Examples 13-18 includes, the initial onboarding information including an address of the onboarding server, wherein an identifier of the new device is provided from the rendezvous service to the onboarding service.

In Example 20, the subject matter of Example 19 includes, the initial onboarding information further including the identifier of the new device and a nonce, and wherein the initial onboarding information is used by the device to validate the second request for network access to continue the onboarding procedure.

In Example 21, the subject matter of Examples 13-20 includes, the rendezvous service being a cloud-hosted service, and wherein the rendezvous service utilizes a manifest to verify a device owner for the onboarding procedure.

In Example 22, the subject matter of Examples 13-21 includes, the first network being an untrusted network that is isolated from the second network, and wherein the rendezvous service verifies identification information associated with the new device prior to providing the initial onboarding information to the new device.

In Example 23, the subject matter of Examples 13-22 includes, the operations being performed as operations of a mediator service, wherein the onboarding server operates as a device owner transfer service (DOTS), and wherein the network platform operates according to an Open Connectivity Foundation (OCF) specification.

In Example 24, the subject matter of Examples 13-23 includes, the operations of the onboarding procedure being performed in connection with validation of the new device by the onboarding server using a self-sovereign identity blockchain.

Example 25 is a machine-readable storage medium including instructions, wherein the instructions, when executed by a processing circuitry of a device, cause the processing circuitry to perform operations of any of Examples 13 to 24.

Example 26 is an apparatus, comprising: means for receiving a first request from a new device for network access to begin an onboarding procedure with a network platform; means for transmitting credentials of a first network to the new device, wherein a rendezvous service is accessible by the new device via the first network, and wherein the rendezvous service is usable by the new device to obtain initial onboarding information associated with the network platform; and means for receiving a second request from the new device for network access to continue the onboarding procedure, the second request including the initial onboarding information; and means for transmitting credentials of a second network to the new device, wherein an onboarding server of the network platform is accessible via the second network, wherein the onboarding server is usable by the new device to perform the onboarding procedure with the network platform.

In Example 27, the subject matter of Example 26 includes, means for accessing and identifying the credentials of the first network and the second network, the credentials comprising respective settings for communications over wireless networks operating according to a specification of an IEEE 802.11 standards family.

In Example 28, the subject matter of Example 27 includes, means for transmitting rendezvous service information to the new device, the rendezvous service information usable by the new device to connect to the rendezvous service via the first network; wherein the first request, the rendezvous service information, and the credentials of the first network are exchanged in secure communications using a software access point hosted by the new device.

In Example 29, the subject matter of Examples 27-28 includes, means for transmitting rendezvous service information to the new device using a discovery beacon, the rendezvous service information usable by the new device to connect to the rendezvous service via the first network; wherein the first request, the rendezvous service information, and the credentials of the first network are provided in the discovery beacon using a software access point hosted by the apparatus.

In Example 30, the subject matter of Examples 26-29 includes, means for operating a proxy to the first network and to the second network, wherein the network access to begin the onboarding procedure and the network access to continue the onboarding procedure are conducted via the apparatus operating as the proxy.

In Example 31, the subject matter of Examples 26-30 includes, the second network being a sandbox network used to complete the onboarding procedure with the network platform, wherein the onboarding server further provides credentials of a third network for network access to continue device service operations within the network platform.

In Example 32, the subject matter of Examples 26-31 includes, the initial onboarding information including an address of the onboarding server, wherein an identifier of the new device is provided from the rendezvous service to the onboarding service.

In Example 33, the subject matter of Example 32 includes, the initial onboarding information further including the identifier of the new device and a nonce, wherein the initial onboarding information is used by the device to validate the second request for network access to continue the onboarding procedure.

In Example 34, the subject matter of Examples 26-33 includes, the rendezvous service being a cloud-hosted service, wherein the rendezvous service utilizes a manifest to verify a device owner for the onboarding procedure.

In Example 35, the subject matter of Examples 26-34 includes, the first network being an untrusted network that is isolated from the second network, wherein the rendezvous service verifies identification information associated with the new device prior to providing the initial onboarding information to the new device.

In Example 36, the subject matter of Examples 26-35 includes, the apparatus operating functions of a mediator service, wherein the onboarding server operates as a device owner transfer service (DOTS), and wherein the network platform operates according to an Open Connectivity Foundation (OCF) specification.

In Example 37, the subject matter of Examples 26-36 includes, the operations of the onboarding procedure being performed in connection with validation of the new device by the onboarding server using a self-sovereign identity blockchain.

Example 38 is an Open Connectivity Foundation (OCF) device, configured as a server, client, or intermediary according to an OCF specification, comprising means to implement the operations of any of Examples 1 to 37.

Example 39 is a device owner transfer service management service adapted to perform the operations invoked by any of Examples 1 to 37.

Example 40 is an access management service adapted to perform the operations invoked by any of Examples 1 to 37.

Example 41 is a credential management service adapted to perform the operations invoked by any of Examples 1 to 37.

Example 42 is an Internet of Things (IoT) network topology, the IoT network topology comprising respective communication links adapted to perform communications for the operations of any of Examples 1 to 37.

Example 43 is a network comprising respective devices and device communication mediums for performing any of the operations of Examples 1 to 37.

Example 44 is an edge cloud computing device implementation comprising processing nodes and computing units adapted for performing any of the operations of Examples 1 to 37.

Example 45 is an edge cloud network platform comprising physical and logical computing resources adapted for performing any of the operations of Examples 1 to 37.

Example 46 is an apparatus comprising means for performing any of the operations of Examples 1 to 37.

Example 47 is a system to perform the operations of any of Examples 1 to 37.

The operations and functionality described above in these examples, and in the specific embodiments described with reference to FIGS. 3 to 18, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system.

Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:
communications circuitry;
processing circuitry; and
a memory device including instructions embodied thereon, wherein the instructions, which when executed by the processing circuitry, configure the processing circuitry to perform operations comprising:
receiving a first request from a new device for network access to begin an onboarding procedure required for joining a network platform;
transmitting network access credentials of a first network to the new device, wherein the first network is a first wireless local area network operating according to a specification of an IEEE 802.11 standards family, wherein the new device accesses a rendezvous service via the first network with use of the network access credentials of the first network, and wherein the new device obtains initial onboarding information associated with the network platform in response to accessing the rendezvous service via the first network;
receiving a second request from the new device for network access to continue the onboarding procedure required for joining the network platform, the second request including the initial onboarding information; and
transmitting network access credentials of a second network to the new device, wherein the second network is a second wireless local area network operating according to the specification of the IEEE 802.11 standards family, wherein the new device accesses an onboarding server of the network platform via the second network with use of the network access credentials of the second network, and wherein the onboarding server performs the onboarding procedure of the new device to join the network platform in response to accessing the onboarding server via the second network.

2. The device of claim 1, wherein the network access credentials of the first network and the second network comprise respective settings for communications over wireless networks operating according to the specification of the IEEE 802.11 standards family.

3. The device of claim 2, the operations further comprising:
transmitting rendezvous service information to the new device, the rendezvous service information usable by the new device to connect to the rendezvous service via the first network;
wherein the first request, the rendezvous service information, and the network access credentials of the first network are exchanged in secure communications using a software access point hosted by the new device.

4. The device of claim 2, the operations further comprising:
transmitting rendezvous service information to the new device using a discovery beacon, the rendezvous service information usable by the new device to connect to the rendezvous service via the first network;
wherein the first request, the rendezvous service information, and the network access credentials of the first network are provided in the discovery beacon using a software access point hosted by the device.

5. The device of claim 1, wherein the network access to begin the onboarding procedure and the network access to continue the onboarding procedure are conducted via the device operating as a proxy to the first network and to the second network.

6. The device of claim 1, wherein the second network is a sandbox network used to complete the onboarding procedure to join the network platform, wherein the onboarding server further provides network access credentials of a third network for network access to continue device service operations within the network platform.

7. The device of claim 1, wherein the initial onboarding information includes an address of the onboarding server, and wherein an identifier of the new device is provided from the rendezvous service to the onboarding server.

8. The device of claim 7, wherein the initial onboarding information further includes the identifier of the new device and a nonce, and wherein the initial onboarding information is used by the device to validate the second request for network access to continue the onboarding procedure.

9. The device of claim 1, wherein the rendezvous service is a cloud-hosted service, and wherein the rendezvous service utilizes a manifest to verify a device owner for the onboarding procedure.

10. The device of claim 1, wherein the first network is an untrusted network that is isolated from the second network, and wherein the rendezvous service verifies identification information associated with the new device prior to providing the initial onboarding information to the new device.

11. The device of claim 1, wherein the operations are performed as operations of a mediator service, wherein the onboarding server operates as a device owner transfer service (DOTS), and wherein the network platform operates according to an Open Connectivity Foundation (OCF) specification.

12. The device of claim 1, wherein the operations of the onboarding procedure are performed in connection with validation of the new device by the onboarding server using a self-sovereign identity blockchain.

13. A method for a zero-touch owner transfer method of onboarding, using operations performed by a device comprising:
receiving a first request from a new device for network access to begin an onboarding procedure required for joining a network platform;
transmitting network access credentials of a first network to the new device, wherein the first network is a first wireless local area network operating according to a specification of an IEEE 802.11 standards family, wherein the new device accesses a rendezvous service via the first network with use of the network access credentials of the first network, and wherein the new device obtains initial onboarding information associated with the network platform in response to accessing the rendezvous service via the first network; and
receiving a second request from the new device for network access to continue the onboarding procedure required for joining the network platform, the second request including the initial onboarding information; and
transmitting network access credentials of a second network to the new device, wherein the second network is a second wireless local area network operating according to the specification of the IEEE 802.11 standards family, wherein the new device accesses an onboarding server of the network platform via the second network with use of the network access credentials of the second network, and wherein the onboarding server performs the onboarding procedure of the new device to join the network platform in response to accessing the onboarding server via the second network.

14. The method of claim 13, wherein the network access credentials of the first network and the second network comprise respective settings for communications over wireless networks operating according to the specification of the IEEE 802.11 standards family.

15. The method of claim 14, further comprising:
transmitting rendezvous service information to the new device, the rendezvous service information usable by the new device to connect to the rendezvous service via the first network;
wherein the first request, the rendezvous service information, and the network access credentials of the first network are exchanged in secure communications using a software access point hosted by the new device.

16. The method of claim 14, further comprising:
transmitting rendezvous service information to the new device using a discovery beacon, the rendezvous service information usable by the new device to connect to the rendezvous service via the first network;
wherein the first request, the rendezvous service information, and the network access credentials of the first network are provided in the discovery beacon using a software access point hosted by the device.

17. The method of claim 13, wherein the network access to begin the onboarding procedure and the network access to continue the onboarding procedure are conducted via the device operating as a proxy to the first network and to the second network.

18. The method of claim 13, wherein the second network is a sandbox network used to complete the onboarding procedure to join the network platform, wherein the onboarding server further provides network access credentials of a third network for network access to continue device service operations within the network platform.

19. The method of claim 13, wherein the initial onboarding information includes an address of the onboarding server, and wherein an identifier of the new device is provided from the rendezvous service to the onboarding server.

20. The method of claim 19, wherein the initial onboarding information further includes the identifier of the new device and a nonce, and wherein the initial onboarding information is used by the device to validate the second request for network access to continue the onboarding procedure.

21. The method of claim 13, wherein the rendezvous service is a cloud-hosted service, and wherein the rendezvous service utilizes a manifest to verify a device owner for the onboarding procedure.

22. The method of claim 13, wherein the first network is an untrusted network that is isolated from the second network, and wherein the rendezvous service verifies identification information associated with the new device prior to providing the initial onboarding information to the new device.

23. The method of claim 13, wherein the operations are performed as operations of a mediator service, wherein the onboarding server operates as a device owner transfer service (DOTS), and wherein the network platform operates according to an Open Connectivity Foundation (OCF) specification.

24. The method of claim 13, wherein the operations of the onboarding procedure are performed in connection with validation of the new device by the onboarding server using a self-sovereign identity blockchain.

25. A non-transitory machine-readable storage medium including instructions, wherein the instructions, when executed by a processing circuitry of a device, cause the processing circuitry to perform operations comprising:
  receiving a first request from a new device for network access to begin an onboarding procedure required for joining a network platform;
  transmitting network access credentials of a first network to the new device, wherein the first network is a first wireless local area network operating according to a specification of an IEEE 802.11 standards family, wherein the new device accesses a rendezvous service via the first network with use of the network access credentials of the first network, and wherein the new device obtains initial onboarding information associated with the network platform in response to accessing the rendezvous service via the first network;
  receiving a second request from the new device for network access to continue the onboarding procedure required for joining the network platform, the second request including the initial onboarding information; and
  transmitting network access credentials of a second network to the new device, wherein the second network is a second wireless local area network operating according to the specification of the IEEE 802.11 standards family, wherein the new device accesses an onboarding server of the network platform via the second network with use of the network access credentials of the second network, and wherein the onboarding server performs the onboarding procedure of the new device to join the network platform in response to accessing the onboarding server via the second network.

\* \* \* \* \*